United States Patent
Kumar et al.

(10) Patent No.: US 7,445,817 B2
(45) Date of Patent: Nov. 4, 2008

(54) PLASMA-ASSISTED FORMATION OF CARBON STRUCTURES

(75) Inventors: Satyendra Kumar, Troy, MI (US); Devendra Kumar, Rochester Hills, MI (US)

(73) Assignee: BTU International Inc., N. Billerica, MA (US)

( * ) Notice: Subject to any disclaimer, the term of this patent is extended or adjusted under 35 U.S.C. 154(b) by 107 days.

(21) Appl. No.: 10/513,309

(22) PCT Filed: May 7, 2003

(86) PCT No.: PCT/US03/14040

§ 371 (c)(1), (2), (4) Date: Jun. 29, 2005

(87) PCT Pub. No.: WO03/095089

PCT Pub. Date: Nov. 20, 2003

(65) Prior Publication Data

US 2005/0271829 A1    Dec. 8, 2005

Related U.S. Application Data

(60) Provisional application No. 60/435,278, filed on Dec. 23, 2002, provisional application No. 60/430,677, filed on Dec. 4, 2002, provisional application No. 60/378,693, filed on May 8, 2002.

(51) Int. Cl.
    *H05H 1/24* (2006.01)
(52) U.S. Cl. .................................... 427/569
(58) Field of Classification Search ................ 427/575, 427/569
    See application file for complete search history.

(56) References Cited

U.S. PATENT DOCUMENTS

| 3,432,296 A | 3/1969 | McKinnon et al. |
| 3,612,686 A | 10/1971 | Braman et al. |
| 3,731,047 A | 5/1973 | Mullen et al. |
| 4,004,934 A | 1/1977 | Prochazka |
| 4,025,818 A | 5/1977 | Giguere et al. |

(Continued)

FOREIGN PATENT DOCUMENTS

DE    222 348 A1    5/1985

(Continued)

OTHER PUBLICATIONS

Qin et al, Growing carbon nanotubes by microwave plasma-enhanced chemical vapor deposition, Jun. 29, 1998, Applied Physics Letters, vol. 72, No. 26, pp. 3437-3439.*

(Continued)

*Primary Examiner*—Timothy Meeks
*Assistant Examiner*—Elizabeth A Burkhart
(74) *Attorney, Agent, or Firm*—Weingarten, Schurgin, Gagnebin & Lebovici LLP

(57) ABSTRACT

Methods and apparatus are provided for igniting, modulating, and sustaining a plasma for synthesizing carbon structures. In one embodiment, a method is provided for synthesizing a carbon structure including forming a plasma by subjecting a gas to electromagnetic radiation in the presence of a plasma catalyst and adding at least one carbonaceous material to the plasma to grow the carbon structures on a substrate. Various types of plasma catalysts are also provided.

40 Claims, 9 Drawing Sheets

U.S. PATENT DOCUMENTS

| | | | |
|---|---|---|---|
| 4,090,055 A | 5/1978 | King | |
| 4,147,911 A | 4/1979 | Nishitani | |
| 4,151,034 A | 4/1979 | Yamamoto et al. | |
| 4,213,818 A | 7/1980 | Lemons et al. | |
| 4,230,448 A | 10/1980 | Ward et al. | |
| 4,265,730 A | 5/1981 | Hirose et al. | |
| 4,307,277 A | 12/1981 | Maeda et al. | |
| 4,339,326 A | 7/1982 | Hirose et al. | |
| 4,404,456 A | 9/1983 | Cann | |
| 4,473,736 A | 9/1984 | Bloyet et al. | |
| 4,479,075 A | 10/1984 | Elliott | |
| 4,500,564 A | 2/1985 | Enomoto | |
| 4,504,007 A | 3/1985 | Anderson, Jr. et al. | |
| 4,609,808 A | 9/1986 | Bloyet et al. | |
| 4,611,108 A | 9/1986 | Leprince et al. | |
| 4,624,738 A | 11/1986 | Westfall et al. | |
| 4,664,937 A | 5/1987 | Ovshinsky et al. | |
| 4,666,775 A | 5/1987 | Kim et al. | |
| 4,687,560 A | 8/1987 | Tracy | |
| 4,698,234 A | 10/1987 | Ovshinsky | |
| 4,760,230 A | 7/1988 | Hassler | |
| 4,767,902 A | 8/1988 | Palaith et al. | |
| 4,772,770 A | 9/1988 | Matsui et al. | |
| 4,792,348 A | 12/1988 | Pekarsky | |
| 4,840,139 A | 6/1989 | Takei | |
| 4,871,581 A | 10/1989 | Yamazaki | |
| 4,877,589 A | 10/1989 | O'Hare | |
| 4,877,938 A | 10/1989 | Rau et al. | |
| 4,883,570 A | 11/1989 | Efthimion et al. | |
| 4,888,088 A | 12/1989 | Slomowitz | |
| 4,891,488 A | 1/1990 | Davis et al. | |
| 4,897,285 A | 1/1990 | Wilhelm | |
| 4,908,492 A | 3/1990 | Okamoto et al. | |
| 4,919,077 A | 4/1990 | Oda et al. | |
| 4,924,061 A | 5/1990 | Labat et al. | |
| 4,939,424 A * | 7/1990 | Kieser et al. | 315/111.21 |
| 4,946,547 A | 8/1990 | Palmour et al. | |
| 4,956,590 A | 9/1990 | Phillips | |
| 4,963,709 A | 10/1990 | Kimrey, Jr. | |
| 4,972,799 A | 11/1990 | Misumi et al. | |
| 5,003,125 A | 3/1991 | Giusti | |
| 5,003,152 A * | 3/1991 | Matsuo et al. | 219/121.59 |
| 5,010,220 A | 4/1991 | Apte et al. | |
| 5,017,404 A | 5/1991 | Paquet et al. | |
| 5,023,056 A | 6/1991 | Aklufi et al. | |
| 5,058,527 A | 10/1991 | Ohta et al. | |
| 5,072,650 A | 12/1991 | Phillips | |
| 5,074,112 A | 12/1991 | Walton et al. | |
| 5,085,885 A | 2/1992 | Foley et al. | |
| 5,087,272 A | 2/1992 | Nixdorf | |
| 5,103,715 A | 4/1992 | Phillips | |
| 5,120,567 A | 6/1992 | Frind et al. | |
| 5,122,633 A | 6/1992 | Moshammer et al. | |
| 5,131,993 A | 7/1992 | Suib et al. | |
| 5,164,130 A | 11/1992 | Holcombe et al. | |
| 5,202,541 A | 4/1993 | Patterson et al. | |
| 5,222,448 A | 6/1993 | Morgenthaler et al. | |
| 5,223,308 A | 6/1993 | Doehler | |
| 5,224,117 A | 6/1993 | Kruger et al. | |
| 5,227,695 A | 7/1993 | Pelletier et al. | |
| 5,271,963 A | 12/1993 | Eichman et al. | |
| 5,276,297 A | 1/1994 | Nara | |
| 5,276,386 A | 1/1994 | Watanabe et al. | |
| 5,277,773 A | 1/1994 | Murphy | |
| 5,284,544 A | 2/1994 | Mizutani et al. | |
| 5,304,766 A | 4/1994 | Baudet et al. | |
| 5,307,892 A | 5/1994 | Phillips | |
| 5,310,426 A | 5/1994 | Mori | |
| 5,311,906 A | 5/1994 | Phillips | |
| 5,316,043 A | 5/1994 | Phillips | |
| 5,321,223 A | 6/1994 | Kimrey, Jr. et al. | |
| 5,349,154 A | 9/1994 | Harker et al. | |
| 5,366,764 A | 11/1994 | Sunthankar | |
| 5,370,525 A | 12/1994 | Gordon | |
| 5,423,180 A | 6/1995 | Nobue et al. | |
| 5,435,698 A | 7/1995 | Phillips | |
| 5,449,887 A | 9/1995 | Holcombe et al. | |
| 5,505,275 A | 4/1996 | Phillips | |
| 5,514,217 A | 5/1996 | Niino et al. | |
| 5,520,740 A | 5/1996 | Kanai et al. | |
| 5,521,360 A | 5/1996 | Johnson et al. | |
| 5,523,126 A | 6/1996 | Sano et al. | |
| 5,527,391 A | 6/1996 | Echizen et al. | |
| 5,536,477 A | 7/1996 | Cha et al. | |
| 5,597,456 A | 1/1997 | Maruyama et al. | |
| 5,607,509 A | 3/1997 | Schumacher et al. | |
| 5,616,373 A | 4/1997 | Karner et al. | |
| 5,645,897 A | 7/1997 | Andra | |
| 5,651,825 A | 7/1997 | Nakahigashi et al. | |
| 5,662,965 A | 9/1997 | Deguchi et al. | |
| 5,670,065 A | 9/1997 | Bickmann et al. | |
| 5,671,045 A | 9/1997 | Woskov et al. | |
| 5,682,745 A | 11/1997 | Phillips | |
| 5,689,949 A | 11/1997 | DeFreitas et al. | |
| 5,712,000 A | 1/1998 | Wei et al. | |
| 5,714,010 A | 2/1998 | Matsuyama et al. | |
| 5,715,677 A | 2/1998 | Wallman et al. | |
| 5,734,501 A | 3/1998 | Smith | |
| 5,735,451 A | 4/1998 | Mori et al. | |
| 5,741,364 A | 4/1998 | Kodama et al. | |
| 5,755,097 A | 5/1998 | Phillips | |
| 5,794,113 A | 8/1998 | Munir et al. | |
| 5,796,080 A | 8/1998 | Jennings et al. | |
| 5,808,282 A | 9/1998 | Apte et al. | |
| 5,828,338 A | 10/1998 | Gerstenberg | |
| 5,841,237 A | 11/1998 | Alton | |
| 5,847,355 A | 12/1998 | Barmatz et al. | |
| 5,848,348 A | 12/1998 | Dennis | |
| 5,849,079 A * | 12/1998 | Gruen et al. | 117/104 |
| 5,851,658 A * | 12/1998 | Yamamoto et al. | 428/334 |
| 5,859,404 A | 1/1999 | Wei et al. | |
| 5,868,871 A | 2/1999 | Yokose et al. | |
| 5,874,705 A * | 2/1999 | Duan | 219/121.43 |
| 5,904,993 A | 5/1999 | Takeuchi et al. | |
| 5,939,026 A | 8/1999 | Seki et al. | |
| 5,945,351 A | 8/1999 | Mathuni | |
| 5,961,773 A | 10/1999 | Ichimura et al. | |
| 5,961,871 A | 10/1999 | Bible et al. | |
| 5,973,289 A | 10/1999 | Read et al. | |
| 5,976,429 A | 11/1999 | Chen et al. | |
| 5,980,843 A | 11/1999 | Silversand | |
| 5,980,999 A | 11/1999 | Goto et al. | |
| 5,989,477 A | 11/1999 | Berger | |
| 5,993,612 A | 11/1999 | Rostaing et al. | |
| 5,998,774 A | 12/1999 | Joines et al. | |
| 6,011,248 A | 1/2000 | Dennis | |
| 6,028,393 A * | 2/2000 | Izu et al. | 315/111.01 |
| 6,038,854 A | 3/2000 | Penetrante et al. | |
| 6,054,693 A | 4/2000 | Barmatz et al. | |
| 6,054,700 A | 4/2000 | Rokhvarger et al. | |
| 6,096,389 A | 8/2000 | Kanai | |
| 6,101,969 A | 8/2000 | Niori et al. | |
| 6,103,068 A | 8/2000 | Merten et al. | |
| 6,122,912 A | 9/2000 | Phillips | |
| 6,131,386 A | 10/2000 | Trumble | |
| 6,132,550 A | 10/2000 | Shiomi | |
| 6,149,985 A | 11/2000 | Grace et al. | |
| 6,152,254 A | 11/2000 | Phillips | |
| 6,153,868 A | 11/2000 | Marzat | |
| 6,183,689 B1 | 2/2001 | Roy et al. | |
| 6,186,090 B1 | 2/2001 | Dotter, II et al. | |
| 6,189,482 B1 | 2/2001 | Zhao et al. | |
| 6,204,606 B1 | 3/2001 | Spence et al. | |
| 6,224,836 B1 | 5/2001 | Moisan et al. | |

| | | | | | | |
|---|---|---|---|---|---|---|
| 6,228,773 | B1 | 5/2001 | Cox | EP | 1 093 846 A1 | 4/2001 |
| 6,238,629 | B1 | 5/2001 | Barankova et al. | EP | 1 427 265 A2 | 6/2004 |
| 6,248,206 | B1 | 6/2001 | Herchen et al. | JP | 56-140021 A2 | 11/1981 |
| 6,264,812 | B1 | 7/2001 | Raaijmakers et al. | JP | 57-119164 A2 | 7/1982 |
| 6,284,202 | B1 | 9/2001 | Cha et al. | JP | 58-025073 A | 2/1983 |
| 6,287,980 | B1 | 9/2001 | Hanazaki et al. | JP | 59-169053 A | 9/1984 |
| 6,287,988 | B1 | 9/2001 | Nagamine et al. | JP | 62-000535 A | 1/1987 |
| 6,297,172 | B1 | 10/2001 | Kashiwagi | JP | 04-74858 A | 3/1992 |
| 6,297,595 | B1 | 10/2001 | Stimson et al. | JP | 06-345541 A | 12/1994 |
| 6,329,628 | B1 | 12/2001 | Kuo et al. | JP | 07-153405 A | 6/1995 |
| 6,342,195 | B1 | 1/2002 | Roy et al. | JP | 09-235686 A | 2/1996 |
| 6,345,497 | B1 | 2/2002 | Penetrante | JP | 08-217558 A | 8/1996 |
| 6,348,158 | B1 | 2/2002 | Samukawa | JP | 08-281423 A | 10/1996 |
| 6,358,361 | B1 | 3/2002 | Matsumoto | JP | 09-017597 A | 1/1997 |
| 6,362,449 | B1 | 3/2002 | Hadidi et al. | JP | 09-023458 A | 1/1997 |
| 6,365,885 | B1 | 4/2002 | Roy et al. | JP | 09-027459 A | 1/1997 |
| 6,367,412 | B1 | 4/2002 | Ramaswamy et al. | JP | 09-027482 A | 1/1997 |
| 6,370,459 | B1 | 4/2002 | Phillips | JP | 09-078240 A | 3/1997 |
| 6,372,304 | B1 | 4/2002 | Sano et al. | JP | 09-102400 A | 4/1997 |
| 6,376,027 | B1 | 4/2002 | Lee et al. | JP | 09-102488 A | 4/1997 |
| 6,383,333 | B1 | 5/2002 | Haino et al. | JP | 09-111461 A | 4/1997 |
| 6,383,576 | B1 | 5/2002 | Matsuyama | JP | 09-137274 A | 5/1997 |
| 6,388,225 | B1 | 5/2002 | Blum et al. | JP | 09-157048 A | 6/1997 |
| 6,392,350 | B1 | 5/2002 | Amano | JP | 09-223596 A | 8/1997 |
| 6,407,359 | B1 | 6/2002 | Lagarde et al. | JP | 09-235686 A | 9/1997 |
| 6,488,112 | B1 | 12/2002 | Kleist | JP | 09-251971 A | 9/1997 |
| 6,512,216 | B2 | 1/2003 | Gedevanishvili et al. | JP | 09-295900 A | 11/1997 |
| 6,522,055 | B2 | 2/2003 | Uemura et al. | JP | 10-066948 A | 3/1998 |
| 6,575,264 | B2 | 6/2003 | Spadafora | JP | 10-081588 A | 3/1998 |
| 6,592,664 | B1 | 7/2003 | Frey et al. | JP | 10-081970 A | 3/1998 |
| 6,610,611 | B2 | 8/2003 | Liu et al. | JP | 10-087310 A | 4/1998 |
| 6,712,298 | B2 | 3/2004 | Kohlberg et al. | JP | 10-204641 A | 8/1998 |
| 6,717,368 | B1 | 4/2004 | Sakamoto et al. | JP | 10-259420 A | 9/1998 |
| 6,870,124 | B2 | 3/2005 | Kumar et al. | JP | 10-294306 A | 11/1998 |
| 2001/0027023 | A1 | 10/2001 | Ishihara et al. | JP | 11-031599 A | 2/1999 |
| 2001/0028919 | A1 | 10/2001 | Liu et al. | JP | 11-106947 A | 4/1999 |
| 2002/0034461 | A1 | 3/2002 | Segal | JP | 11-145116 A | 5/1999 |
| 2002/0036187 | A1 | 3/2002 | Ishll et al. | JP | 11-186222 A | 7/1999 |
| 2002/0124867 | A1 | 9/2002 | Kim et al. | JP | 11-228290 A | 8/1999 |
| 2002/0135308 | A1 | 9/2002 | Janos et al. | JP | 11-265885 A | 9/1999 |
| 2002/0140381 | A1 | 10/2002 | Golkowski et al. | JP | 11-273895 A | 10/1999 |
| 2002/0190061 | A1 | 12/2002 | Gerdes et al. | JP | 11-297266 A | 10/1999 |
| 2002/0197882 | A1 | 12/2002 | Niimi et al. | JP | 2000-012526 A | 1/2000 |
| 2003/0071037 | A1 | 4/2003 | Sato et al. | JP | 2000-173989 A | 6/2000 |
| 2003/0111334 | A1 | 6/2003 | Dodelet et al. | JP | 2000-203990 A | 7/2000 |
| 2003/0111462 | A1 | 6/2003 | Sato et al. | JP | 2000-269182 A | 9/2000 |
| 2004/0001295 | A1 | 1/2004 | Kumar et al. | JP | 2000-288382 A | 10/2000 |
| 2004/0004062 | A1 | 1/2004 | Kumar et al. | JP | 2000-306901 A | 11/2000 |
| 2004/0070347 | A1 | 4/2004 | Nishida et al. | JP | 2000-310874 A | 11/2000 |
| 2004/0089631 | A1 | 5/2004 | Blalock et al. | JP | 2000-310876 A | 11/2000 |
| 2004/0107796 | A1 | 6/2004 | Kumar et al. | JP | 2000-317303 A | 11/2000 |
| 2004/0107896 | A1 | 6/2004 | Kumar et al. | JP | 2000-323463 A | 11/2000 |
| 2004/0118816 | A1 | 6/2004 | Kumar et al. | JP | 2000-348897 A | 12/2000 |
| | | | | JP | 2001-013719 A | 1/2001 |
| | | FOREIGN PATENT DOCUMENTS | | JP | 2001-053069 A | 2/2001 |
| DE | | 195 42 352 A1 | 5/1997 | JP | 2001-058127 A | 3/2001 |
| DE | | 100 05 146 A1 | 8/2001 | JP | 2001-093871 A | 4/2001 |
| EP | | 0 228 864 B1 | 7/1987 | JP | 2001-149754 A | 6/2001 |
| EP | | 0 335 675 A2 | 10/1989 | JP | 2001-149918 A | 6/2001 |
| EP | | 0 435 591 A2 | 12/1990 | JP | 2001-196420 A | 7/2001 |
| EP | | 0 436 361 A1 | 12/1990 | JP | 2001-303252 A | 10/2001 |
| EP | | 0 228 864 B1 | 3/1991 | JP | 2001-332532 A | 11/2001 |
| EP | | 0 435 591 A2 * | 3/1991 | JP | 2001-351915 A | 12/2001 |
| EP | | 0 420 101 A2 | 4/1991 | JP | 2002-022135 A | 1/2002 |
| EP | | 0 435 591 A | 7/1991 | JP | 2002-028487 A | 1/2002 |
| EP | | 0 436 361 A1 | 7/1991 | JP | 2002-069643 A | 3/2002 |
| EP | | 0 520 719 B1 | 12/1992 | JP | 2002-075960 A | 3/2002 |
| EP | | 0 670 666 B1 | 9/1995 | JP | 2002-126502 A | 5/2002 |
| EP | | 0 520 719 B1 | 5/1996 | JP | 2002-273161 A | 9/2002 |
| EP | | 0 724 720 B1 | 8/1996 | JP | 2002-273168 A | 9/2002 |
| EP | | 0 670 666 B1 | 6/1998 | JP | 2003-075070 A | 3/2003 |
| EP | | 0 724 720 B1 | 5/2000 | JP | 2003-264057 A | 9/2003 |
| | | | | WO | WO 95-11442 A1 | 4/1995 |

| | | |
|---|---|---|
| WO | WO 96/06700 A1 | 3/1996 |
| WO | WO 96/38311 A1 | 12/1996 |
| WO | WO 97-13141 A1 | 4/1997 |
| WO | WO 01-55487 A2 | 8/2001 |
| WO | WO 01-58223 A1 | 8/2001 |
| WO | WO 01-82332 A1 | 11/2001 |
| WO | WO 02-26005 A1 | 3/2002 |
| WO | WO 02-026005 A1 | 3/2002 |
| WO | WO 02-061165 A1 | 8/2002 |
| WO | WO 02-061171 A1 | 8/2002 |
| WO | WO 02-062114 A1 | 8/2002 |
| WO | WO 02-062115 A1 | 8/2002 |
| WO | WO 02-067285 A2 | 8/2002 |
| WO | WO 02-067285 A3 | 8/2002 |
| WO | WO 03-018862 A2 | 3/2003 |
| WO | WO 03-018862 A3 | 3/2003 |
| WO | WO 03-028081 A2 | 4/2003 |
| WO | WO 03-095058 A2 | 11/2003 |
| WO | WO 03-095089 A1 | 11/2003 |
| WO | WO 03-095090 A1 | 11/2003 |
| WO | WO 03-095130 A1 | 11/2003 |
| WO | WO 03-095591 A1 | 11/2003 |
| WO | WO 03-095699 A1 | 11/2003 |
| WO | WO 03-095807 A1 | 11/2003 |
| WO | WO 03-096369 A1 | 11/2003 |
| WO | WO 03-096370 A1 | 11/2003 |
| WO | WO 03-096380 A2 | 11/2003 |
| WO | WO 03-096381 A2 | 11/2003 |
| WO | WO 03-096382 A2 | 11/2003 |
| WO | WO 03-096383 A2 | 11/2003 |
| WO | WO 03-096747 A2 | 11/2003 |
| WO | WO 03-096749 A1 | 11/2003 |
| WO | WO 03-096766 A1 | 11/2003 |
| WO | WO 03-096768 A1 | 11/2003 |
| WO | WO 03-096770 A1 | 11/2003 |
| WO | WO 03-096771 A1 | 11/2003 |
| WO | WO 03-096772 A1 | 11/2003 |
| WO | WO 03-096773 A1 | 11/2003 |
| WO | WO 03-096774 A1 | 11/2003 |
| WO | WO 2004-050939 A2 | 6/2004 |

OTHER PUBLICATIONS

Willert-Porada, M., "Alternative Sintering Methods" 1 page Abstract dated Nov. 8, 2001, http://www.itap.physik.uni-stuttgart.de/~gkig/neu/english/welcome.php?/~gkig/neu/abstracts/abstract_willert-porada.html.
Accentus Corporate Overview, 3 pages—http://www.accentus.co.uk/ipco/html/techenv6_txt_fr.html (2003).
Agrawal et al., "Grain Growth Control in Microwave Sintering of Ultrafine WC-Co Composite Powder Compacts," Euro PM99 Conference, Sintering, Turino, Italy, 8 pages (1999).
Agrawal, "Metal Parts from Microwaves," *Materials World* 7(11):672-673 (1999).
Agrawal et al., "Microwave Sintering of Commercial WC/Co Based Hard Metal Tools," Euro PM99 Conference, Sintering, Turino, Italy, 8 pages (1999).
Agrawal, "Microwave Processing of Ceramics," *Current Opinion in Solid State and Materials Science* 3:480-485 (Oct. 1998).
Air Liquide, "Heat Treatment—Gas Quenching,"—http://www.airliquide.com/en/business/industry/metals/applications/heat_treatment/quenching.asp, 1 page (2000).
Alexander et al., "Electrically Conductive Polymer Nanocomposite Materials," AFRL's Materials and Manufacturing Directorate, Non-metallic Materials Division, Polymer Branch, Wright-Patterson AFB OH—http://www.afrlhorizons.com/Briefs/Sept02/ML0206.html , 2 pages (Sep. 2002).
Al-Shamma'a et al., "Microwave Atmospheric Plasma for Cleaning Exhaust Gases and Particulates," Future Car Congress, Washington, Jun. 3-5, 2002 (1 page).
Alton et al., "A High-Density, RF Plasma-Sputter Negative Ion Source," The 8$^{th}$ Intl. Conf. on Heavy-Ion Accelerator Technology, Argonne Natl. Lab., Oct. 5-9, 1998, Poster Presentation (3 pages).
Anklekar et al., "Microwave Sintering and Mechanical Properties of PM Copper Steel," *Powder Metallurgy* 44(4):355-362 (2001).
Batanov et al., "Plasmachemical Deposition of Thin Films in a Localized Free-Space Microwave Discharge," *Technical Physics* 38(6):475-479 (Jun. 1993).
"Carbonitriding," Treat All Metals, Inc., 2 pages—http://www.treatallmetals.com/carbon.htm.
"Carburizing," Treat All Metals, Inc.—http://www.treatallmetals.com/gas.htm, 2 pages.
Cheng, J., "Fabricating Transparent Ceramics by Microwave Sintering," *Am. Ceramic Soc. Bull.* 79(9):71-74 (2000).
Cheng et al., "Microwave Processing of WC-Co Composites And Ferroic Titanates" *Mat. Res. Innovat.* 1(1):44-52 (Jun. 1997).
Circle Group Holdings, Inc., "StarTech Environmental Corp."—http://www.crgq.com/cgiweb/HTML/eMentor_Companies/startech.html, 9 pages.
"Classification of Cast Iron"—Key to Steel—Article—http://www.key-to-steel.com/Articles/Art63.htm, 3 pages (1999).
Collin, in: *Foundations for Microwave Engineering*, 2d Ed., IEEE Press, NY, pp. 180-192 (2001).
"Controlled Atmospheres Sinter-Hardening,," Sarnes Ingenieure, 2 pages, http://www.space-ctrl.de/de/2002/06/399.php (2002).
Egashira et al., "Decomposition of Trichloroethylene by Microwave-Induced Plasma Generated from SiC Whiskers," *J. Electrochem. Soc.*, 145(1):229-235 (Jan. 1998).
Ford 1.3L Catalytic Converter (1988-1989) product description—http://catalyticconverters.com/FO13L43778889.html, 1 page, Undated.
Ford Contour Catalytic Converter (1995-1996) product description—http://www.all-catalytic-converters.com/ford-contour-converter.html, 2 pages, Undated.
Fraunhofer ILT, "Plasma-Reactors for Aftertreatment of Automobile Exhaust Gas," Fraunhofer-Gesellschaft—http://www.ilt.fhg.de/eng/jb01-s35.html, 1 page (2002).
French, "The Plasma Waste Converter—From Waste Disposal to Energy Creation," The International Chemical Weapons Demilitarization Conference, Gifu City, Japan (May 22-24, 2001)—http://www.arofe.army.mil/Conferences/CWC2001/French.htm, 1 page.
Gao et al., "Superfast Densification of Oxide/Oxide Ceramic Composites," *J. Am. Ceram. Soc.* 82(4)1061-1063 (1999).
Gedevanishvili et al., "Microwave Combustion Synthesis And Sintering of Intermetallics and Alloys," *J. Mat. Sci. Lett.* 18(9):665-668 (1999).
General Eastern, "Semiconductor Manufacturing—Using the HygroTwin 2850 to Reduce Costs, Improve Quality,", 3 pages, www.generaleastern.net (1997).
George, "The Catalytic Converter," 5 pages, (2002)—http://krioma.net/articles/Catalytic%20Converter/Catalytic%20Converter.htm.
GlassTesseract.Org website, "Tech Procedures and Tips: Exhaust Manifolds and Catalytic Converters Removal—and Installation", 4 pages (2003). http://glasstesseract.org/tech/catalytic.html.
*Hackh's Chemical Dictionary*, 3rd edition, J. Grant, Ed., McGraw Hill Book Co., NY, pp. 174-175 (1944).
"Heat Treatment of Steels—The Processes," AZoM.com, 9 pages, (2002)—www.azom.com.
"Powder Metallurgy—Overview of the Powder Metallurgy Process," AZoM.com, 3 pages (2002)—http://www.azom.com/details.asp?ArticleID=1414.
Honda Automobile News Press Release, "Honda Introduces Its First Two Clean Air Vehicles, the Civic Ferio LEV and Partner 1.6 LEV," 3 pages (Feb. 1997)—http://world.honda.com/news/1997/4970217a.html.
Honda Civic CX Catalytic Converter, (1996-2000) 1 page—http://www.catalyticconverters.com/HOCIVICCX4349600.html, Undated.
"How A Blast Furnace Works—The Blast Furnace Plant," AISI Learning Center, 7 pages. http://www.steel.org/learning/howmade/blast_furnace.htm., Undated.
"How Is Steel Made," Answer Discussion, 6 pages—http://ourworld.compuserve.com/homepages/Dyaros/stlmanuf.htm, Undated.

Hsu et al., "Palladium-Coated Kieselguhr for Simultaneous Separation and Storage of Hydrogen," Westinghouse Savannah River Company, U.S. Dept. of Commerce, National Technical Information Service, 14 pages (2001).

Fincke, "Hydrogen Separation Membrane,—Advanced Gas Separation: H2 Separation," Summary of research proposal, 1 page (2003).

"IRC in Materials Processing: Advanced Melting, Atomisation, Powder and Spray Forming, Plasma Melting—Operation of a Plasma Furnace," University of Birmingham website, 3 pages—http://www.irc.bham.ac.uk/theme1/plasma/furnace.htm, Undated.

Saville, in: *Iron and Steel*, Chapter 6, pp. 16-22, Wayland Publ., England (1976).

Japanese Advanced Environment Equipment, "Mitsubishi Graphite Electrode Type Plasma Furnace," 3 pages, Undated—http://nett21.unep.or.jp/JSIM_DATA/WASTE/WASTE_3/html/Doc_467.html.

Johnson, Faculty Biography webpage, Dept. of Materials Science & Engineering, Northwestern University, 2 pages—http://www.matsci.northwestern.edu/faculty/ dlj.html, Undated.

Kalyanaraman et al., "Synthesis and Consolidation of Iron Nanopowders," *NanoStructured Materials* 10(8):1379-1392 (1998).

Karger, Scientific Staff Research Areas for KTP Company, 2 pages (Nov. 2002)—http://wwwfb10.upb.de/KTP/KTP-ENG/Staff/Karger/body_karger.html.

Kong et al., "Nuclear-Energy-Assisted Plasma Technology for Producing Hydrogen," Nuclear Energy Research Initiative Research Proposal, 4 pages (2002).

Lewis, in: *Hawley's Condensed Chemical Dictionary*, 12th ed., pp. 230-232, Van Nostrand Reinhold, NY (1993).

Lucas, "Welding Using Microwave Power Supplies," Faculty webpage, 1 page—http://www.liv.ac.uk/EEE/research/cer/project6.htm, Undated.

Luggenholscher et al., "Investigations on Electric Field Distributions in a Microwave Discharge in Hydrogen," Institute fur Laser- und Plasmaphysik, Univsitat Essen, Germany, 4 pages, Undated.

March Plasma Systems, product descriptions,2 pages (2002)—http://www.marchplasma.com/micro_app.htm, Undated.

"Micro-fabricated Palladium-Silver Membrane for Hydrogen Separation and Hydro/Dehydrogenation Reactions," Research Education Group webpage, 5 pages—http://utep.el/utwente/nl/tt/projects/sepmem/—Undated.

Ahmed et al., "Microwave Joining of Alumina and Zirconia Ceramics," IRIS Research Topics 1998, 1 page (1988).

"Microwave Welding," EWi WeldNet, 1 page—(2003) http://www.ferris.edu/cot/accounts/plastics/ htdocs/Prey/Microwave%20Homepage.htm.

"Microwave Welding of Plastics," TWI World Centre for Materials Joining Technology, 2 pages, (Aug. 2002)—http://www.twi.co.uk/j32k/protected/band_3/ksab001.htm.

"Microwave Welding," Welding and Joining Information Network, 3 pages (Nov. 2002)—http://www.ewi.org/technologies/plastics/microwave.asp.

Moss et al., "Experimental Investigation of Hydrogen Transport Through Metals," Experiment Description, Los Alamos National Library, 5 pages—Undated. http://www.education.lanl.gov/RESOURCES/h2/dye/education.html.

"Nitriding," Treat All Metals, Inc., 2 pages—Undated—http://www.treatallmetals.com/nitrid.htm.

Thomas et al., "Non-Thermal Plasma Aftertreatment of Particulates—Theoretical Limits and Impact on Reactor Design," SAE Spring Fuels and Lubes Conference, Paris, France, 27 pages—Jun. 19-22, 2000—http://www.aeat.co.uk/electrocat/sae/saepaper.htm.

"Using Non-Thermal Plasma Reactor to Reduce NOx Emissions from CIDI Engines," Office of Energy Efficiency and Renewable Energy, Office of Transportation, 1 page (Apr. 1999).

"Optoelectronic Packaging Applications," March Plasma Systems, Product Description, 2 pages (2002)—http://www.marchplasma.com/opto_app.htm.

Paglieri et al., "Palladium Alloy Composite Membranes for Hydrogen Separation," 15th Annual Conf. Fossil Energy Matter, Knoxville, TN (2001), 5 pages.

Peelamedu et al., "Anisothermal Reaction Synthesis of Garnets, Ferrites, and Spinels In Microwave Field," *Materials Research Bulletin* 36:2723-2739 (Dec. 2001).

PerfectH2 PE8000 Series Product Description, Palladium Diffusion Hydrogen Purifier For High Flow Rate MOCVD Applications, Matheson Tri.Gas, 2 pages (2002).

Photonics Directory, Definition for Thyratron, (Laurin Publishing), 2 pages http://www.photonics.com/directory.

Pingel, "About What Every P/A Should Know About P/M," Powder Metallurgy Co., 9 pages—http://www.powdermetallurgyco.com/pm_about.htm.

"Plasma Applications," Coalition for Plasma Science, 2 pages (1999, 2000)—http://www.plasmacoalition.org/applications.htm.

"Plasma Carburizing," 1 page—Undated, http://www.ndkinc.co.jp/ndke04.html.

"Plasma Direct Melting Furnace," Materials Magic, Hitachi Metals Ltd., 3 pages—Undated, http://www.hitachi-metals.co.jp/e/prod/prod07/p07_2_02.html.

"Classical Plasma Applications," 2 pages (2002)—http://www.plasma.iinpe.br/English/Classical_Applications.htm.

"Plasma Nitride Process Description," Northeast Coating Technologies, 2 pages, Undated, www.northeastcoating.com.

Plasma Science and Technology, "Plasmas for Home, Business and Transportation," 4 pages—Undated. http://www.plasmas.org/rot-home.htm.

"Novel Plasma Catalysts Significantly Reduce NOx from Diesel Engines," US Department of Energy research summary, 2 pages (Apr. 2001)—http://www.ott.doe.gov/success.html.

"Printed Circuit Board (PCB) Plasma Applications," March Plasma Systems product descriptions, 2 pages (2002)—http://www.marchplasma.com/pcb_app.01.htm.

Roy et al., "Definitive Experimental Evidence for Microwave Effects: Radically New Effects of Separated E and H Fields, Such As Decrystallization of Oxides in Seconds," *Materials Research Innovations* 6(3):129-140 (2002).

Roy et al., "Full Sintering of Powdered-Metal Bodies In A Microwave Field," *Nature* 399:668-670 (Jun. 17, 1999).

Roy et al., "Major phase transformations and magnetic property changes caused by electromagnetic fields at microwave frequencies," *J. Mat. Res.* 17(12):3008-3011 (2002).

Roy et al., "Microwave Processing: Triumph of Applications-Driven Science in WC-Composites And Ferroic Titanates," *Ceramic Transactions* 80:3-26, (1997).

Rusanov, Introduction to the Hydrogen Energy & Plasma Technologies Institute: Russian Research Centre Kurchatov Institute, 13 pages, Undated—http://www.kiae.ru/eng/str/ihept/oiivept.htm.

Samant et al., "Glow Discharge Plasma Nitriding of Al 6063 Samples and Study of Their Surface Hardness," *Metallofiz. Noveishe Tekhnol.* 23(3):325-333 (2001).

Sato et al., "Surface Modification of Pure Iron by rf Plasma Nitriding with dc Bias Voltage Impression," *Hyomen Gijutsu* 48(3):317-323 (1997) (English Abstract).

Saveliev et al., "Effect of Cathode End Caps and a Cathode Emissive Surface on Relativistic Magnetron Operation," *IEEE Transactions on Plasma Science* 28:3.478-484 (Jun. 2000).

SC/Tetra Engine Manifold Application, 2 pages (2001)—http://www.sctetra.com/applications/01_manifold.htm.

Shulman, "Microwaves In High-Temperature Processes," GrafTech Intl. Ltd., 8 pages (Mar. 2003) http://www.industrialheating.com/CDA/ArticleInformation/features/BNP_Features_Item/0,2832,94035,00,html.

Slone et al., "NOx Reduction For Lean Exhaust Using Plasma Assisted Catalysis," NOXTECH Inc., 5 pages (2000)—http://www.osti.gov/fcvt/deer2000/bhattpa.pdf.

Stockwell Rubber Company, Inc., "Conductive Silicone Rubber Compounds Product Selection Guide," Electrically Conducive Materials Chart, 3 pages, Undated—http://www.stockwell.com/electrically_conducive_produc.htm.

Sumitomo Heavy Industries, Ltd., "Spark Plasma Sintering," 3 pages (2001)—http://www.shi.co.jp/sps/eng.

"Surface Hardening" Services Description for AHS Corp., 5 pages, Undated—http://www.ahscorp.com/surfaceh.html.

Takizawa et al. "Synthesis of inorganic materials by 28 GHz Microwave Irradiation," *Transactions of the Materials Research Society of Japan* 27(1):51-54 (2002).

Taube et al., "Advances in Design of Microwave Resonance Plasma Source," American Institute of Chemical Engineering, 2004 Annual Meeting, Presentation (Nov. 2004).

"testMAS: Pressure Sintering," 11 pages, Undated—http://cybercut.berkley.edu/mas2/processes/sinter_pressure.

Wolf et al., "The Amazing Metal Sponge: Simulations of Palladium-Hydride," 2 pages, Undated—http://www.psc.edu/science/Wolf/Wolf.html.

Toyota Motor Sales, "Emission Sub Systems—Catalytic Converter," 10 pages, Undated.

Uchikawa et al., "New Technique of Activating Palladium Surface for Absorption of Hydrogen or Deuterium," *Japanese J. Appl. Phys.* 32:5095-5096, Part 1, No. 11A (Nov. 1993).

Wang et al., "Densification of $Al_2O_3$ Powder Using Spark Plasma Sintering," *J. Mater. Res.*, 15(4):982-987 (Apr. 2000).

Way et al., "Palladium/Copper Alloy Composite Membranes for High Temperature Hydrogen Separation from Coal-Derived Gas Streams," Research Grant Report, Dept. of Chemical Engineering, Colorado School of Mines, 3 pages (1999).

Lucas, "Welding Breakthrough: Generating and Handling a Microwave Powered Plasma," Australian Industry News, Information & Suppliers, 7 pages (Sep. 2001)—http://www.industry/search.com.au/features/microwave.asp.

"Welding Plastic Parts," Business New Publishing Company, 4 pages (Nov. 2000)—http://www.assemblymag.com/Common/print_article.asp?rID=E455512C17534C31B96D.

Xie et al., "Effect of Rare Earths in Steels on the Thermochemical Treatments and the Functional Mechanisms of the Rare Earths," *Rare Metals Materials and Engineering* 26(1):52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jul. 23, 2003, in PCT/US03/14037.

International Search Report issued on Aug. 15, 2003, in PCT/US03/14124..

International Search Report issued on Sep. 10, 2003, in PCT/US03/14132.

International Search Report issued on Aug. 14, 2003, in PCT/US03/14052.

International Search Report issued on Aug. 14, 2003, in PCT/US03/14054.

International Search Report issued on May 10, 2004, in PCT/US03/14036.

International Search Report issued on Aug. 9, 2003, in PCT/US03/14053.

International Search Report issued on Feb. 25, 2004, in PCT/US03/14034.

International Search Report issued on Sep. 19, 2003, in PCT/US03/14039.

International Search Report issued on Aug. 29, 2003, in PCT/US03/14038.

International Search Report issued on Dec. 30, 2003, in PCT/US03/14133.

International Search Report issued on Aug. 28, 2003, in PCT/US03/14035.

International Search Report issued on Jul. 29, 2003, in PCT/US03/14040.

International Search Report issued on Sep. 10, 2003, in PCT/US03/14134.

International Search Report issued on Aug. 29, 2003, in PCT/US03/14122.

International Search Report issued on Sep. 30, 2003, in PCT/US03/14130.

International Search Report issued on May 24, 2004, in PCT/US03/14055.

International Search Report issued on May 26, 2004, in PCT/US03/14137.

International Search Report issued on Aug. 29, 2003, in PCT/US03/14123.

International Search Report issued on Aug. 29, 2003, in PCT/US03/14121.

International Search Report issued on Sep. 16, 2003, in PCT/US03/14136.

International Search Report issued on May 25, 2004, in PCT/US03/14135.

Written Opinion issued on Apr. 13, 2004, in PCT/US03/014037.

Examination Report issued on Feb. 24, 2004, in PCT/US03/14054.

Written Opinion issued on Dec. 22, 2003, in PCT/US03/14053.

Examination Report issued on Apr. 26, 2004, in PCT/US03/14053.

Written Opinion issued on Dec. 22, 2003, in PCT/US03/14123.

Examination Report issued on Apr. 26, 2004, in PCT/US03/14123.

Quayle Action issued on Apr. 19, 2004, in U.S. Appl. No. 10/430,414.

Office Action issued on May 18, 2004, in U.S. Appl. No. 10/430,426.

Reply to Office Action filed on Nov. 18, 2004, in U.S. Appl. No. 10/430,426.

Office Action issued on Feb. 24, 2005, in U.S. Appl. No. 10/430,426.

Accentus—http://www.accentus.co.uk/ipco/html/techenv6_txt_fr.html.

Agrawal et al., "Grain Growth Control in Microwave Sintering of Ultrafine WC-Co Composite Powder Compacts," Euro PM99, Sintering, Italy, 8 pages (1999).

Agrawal et al., "Microwave Sintering of Commercial WC/Co Based Hard Metal Tools," Euro PM99, Sintering, Italy, 8 pages (1999).

Agrawal, D., "Metal Parts from Microwaves," 2 pages.

Agrawal, D., "Microwave Processing of Ceramics," *Current Opinion in Solid State and Material Science*, 3:480-485 (1998).

Air Liquide, Heat Treatment—Gas Quenching,—http://www.airliquide.com/en/business/industry/metals/applications/heat_treatment/quenching, 1 page (2000).

Alexander et al., "Electrically Conducive Polymer Nanocomposite Materials," AFRL's Materials and Manufacturing Directorate, Nonmetallic Materials Division, Polymer Branch, Wright-Patterson AFB OH—http://www.afrlhorizons.com/Briefs/Sept02/ML0206.html , 2 pages (Sep. 2002).

Al-Shamma'a et al., "Microwave Atmospheric Plasma for Cleaning Exhaust Gases and Particulates," University of Liverpool, Dept. of Electrical Engineering and Electronics.

Alton et al., "A High-Density, RF Plasma-Sputter Negative Ion Source," 3 pages.

Anklekar et al., Microwave Sintering And Mechanical Properties of PM Copper Steel, pp. 355-362 (2001)

Batanov et al., "Plasmachemical Deposition of Thin Films in a Localized Free-Space Microwave Discharge," *Technical Physics*, 38:6, pp. 475-479 (1993).

Carbonitriding, Treat All Metals, Inc., 2 pages—http://www.treatallmetals.com/carbon.htm.

Carburizing,—Heat Treating by Treat All Metals—http://www.treatallmetals.com/gas.htm, 2 pages.

Cheng et al., "Microwave Processing of WC-Co Composites And Ferroic Titanates" (Original Article), *Mat Res Innovat* (1):44-52 (1997).

Cheng, J., "Fabricating Transparent Ceramics by Microwave Sintering," *Focus on Electronics*, 79:9, pp. 71-74 (2000).

Circle Group Holdings, Inc. eMentor Companies "StarTech Environmental Corp."—http://www.crgq.com/cgiweb/HTML/eMentor_Companies/startech.html, 9 pages.

Classification of Cast Iron—Key to Steel—Article—http://www.key-to-steel.com/Articles/Art63.htm, 3 pages.

Collin, *Foundations for Microwave Engineering*, 2d Ed., IEEE Press, NY, pp. 180-192 (2001).

Controlled Atmosphere Sinter-Hardening, 2 pages.

Egashira,. "Decomposition of Trichloroethylene by Microwave-induced Plasma Generated from SiC whiskers," *J. Electrochem. Soc.*, 145:I, pp. 229-235 (Jan. 1998).

Ford 1.3L Catalytic Converter (1988-1989)—http://catalyticconverters.com/FO13L43778889.html, 1 page.

Ford Contour Catalytic Converter (1995-1996)—http://www.all-catalytic-converters.com/ford-contour-converter.html, 2 pages.

Fraunhofer ILT, "Plasma-Reactors for Aftertreatment of Automobile Exhaust Gas," Fraunhofer-Gesellschaft (2002)—http://www.ilt.fhg.de/eng/jb01-s35.html, 1 page.

French, "The Plasma Waste Converter—From Waste Disposal to Energy Creation,"—http://www.arofe.army.mil/Conferences/CWC2001/French.htm, p. 1.

Gao et al., "Superfast Densification of Oxide/Oxide Ceramic Composites," J. Am. Ceram. Soc. 82[4]1061-63 (1999)—http://216.239.39.100/search?q=cache:b-TFhQInU6YC:www.umr/edu/ ~hruiz/GaoShen.ppt+spark+plasma.

Gedevanishvili et al., "Microwave Combustion Synthesis and Sintering of Intermetallics and Alloys," *Journal of Materials Science Letters*, (18), pp. 665-668 (1999).

General Eastern, Semiconductor Manufacturing—Using the HygroTwin 2850 to Reduce Costs, Improve Quality, TIM 003, 3 pages, (1997).

George, S.J., "The Catalytic Converter," 5 pages, (2002)—http://krioma.net/Articles/Catalytic%20Converter/Catalytic%20Converter.html.

GlassTesseract.Org—The Home of Kenz Benz, "Tech Procedures and Tips: Exhaust Manifolds and Catalytic Converters Removal—and Installation", 4 pages (2003)—http://glasstesseract.org/tech/catalytic.html.

Grant, J., Hackh's Chemical Dictionary, 3rd ed. p. 174-175.

Holt Walton & Hill, Heat Treatment of Steels—The Processes, Azom.com, 9 pages, (2002).

Holt Walton & Hill, Powder Metallurgy—Overview of the Powder Metallurgy Process, Azom.com, 3 pages (2002)—http://www.azom.com/details.asp?ArticleID=1414.

Honda Automobile News Press Release, "Honda Introduces Its First Two Clean Air Vehicles, The Civic Ferio LEV and Partners 1.6 LEV", 3 pages (Feb. 1997)—http://world.honda.com/news/1997/4970217a.html.

Honda Civic CX Catalytic Converter, 1 page (1996-2000)—http://www.catalyticconverters.com/HOCIVICCX4349600.html.

How A Blast Furnace Works—The Blast Furnace Plant, AISI Learning Center: http://www.steel.org/learning/howmade/blast_furnace.htm.

How Is Steel Made, Answer Discussion, 6 pages—http://ourworld.compuserve.com/homepages/Dyaros/stlmanuf.htm.

Hydrogen Separation Membrane,—Advanced Gas Separation: H2 Separation, 1 page (2001).

IRC in Materials Processing, "Advanced Melting, Atomisation, Powder and Spray Forming, Plasma Melting—Operation of a Plasma Furnace," University of Birmingham, 3 pages—http://www.irc.bham.ac.uk/theme1/plasma/furnace.htm.

*Iron and Steel*, 6:(16-22).

Japanese Advanced Environment Equipment, "Waste and Recycling Equipment—Mitsubishi Graphi Electrode Type Plasma Furnace," 3 pages—http://nett21.unep.or.ip/JSIM_DATA/WASTE/WASTE_3/html/Doc_467.html.

Johnson, D.L., "Fundamentals of Novel Materials Processing," Dept. of Materials Science & Engineering, Northwestern University, 2 pages—http://www.matsci.northerwestern.edu/faculty/ dlj.html.

Kalyanaraman et al., "Synthesis and Consolidation of Iron Nanopowders," *NanoStructured Materilas*, vol. 10, No. 8, pp. 1379-1392 (1998).

Karger, Odo—Area of Work: Microwave Welding, 2 pages (Nov. 2002).

Kong et al., "Nuclear-Energy-Assisted Plasma Technology for Producing Hydrogen," Nuclear Energy Research Initiative, 4 pages (2002).

Lewis, R. J. Sr., "Hawley's Condensed Chemical Dictionary," 12th ed., p. 230-232 (1993).

Lucas, J., "Welding Using Microwave Power Supplies," Computer Electronics & Robotics—http://www.liv.ac.uk/EEE/research/cer/project6.htm.

Luggenholscher et al., "Investigations on Electric Field Distributions in a Microwave Discharge in Hydrogen," Institute fur Laser- und Plasmaphysik, Univsitat Essen, Germany, 4 pages.

Microelectronics Plasma Applications,—March Plasma Systems, 2 pages (2002)—http://www.marchplasma.com/micro_app.htm.

Micro-fabricated Palladium-Silver Membrane for Hydrogen Separation and Hydro/Dehydrogenation Reactions, Research Education Group, 5 pages—http://utep.el.utwente.nl/tt/projects/sepmem/.

Microwave Joining of Alumina and Zirconia Ceramics, IRIS, Research Topics 1998, 1 page.

Microwave Welding (EWi Welding Network) 1 page—http://www.ferris.edu/cot/accounts/plastics/ htdocs/Prey/Microwave%20Homepage.htm.

Microwave Welding of Plastics, TWI World Centre for Materials Joining Technology, 2 pages, (Aug. 2002)—http://www.twi.co.uk/j32k/protected/band_3/ksab001.htm.

Microwave Welding, Welding and Joining Information Network, 3 pages (Nov. 2002)—http://www.ewi.org/technologies/plastics/microwave.asp.

Moss et al., "Experimental Investigation of Hydrogen Transport Through Metals," Los Alamos National Library, 5 pages—http://www.education.lanl.gov/RESOURCES/h2/dye/education.html.

Nitriding, Treat All Metals, Inc., 2 pages -http://www.treatallmetals.com/nitrid.htm.

Non-Thermal Plasma Aftertreatment of Particulates—Theoretical Limits and Impact on Reactor Design, 27 pages—http://www.aeat.com/electrocat/sae/intro...references.htm.

Office of Energy Efficiency, "Using Non-Thermal Plasma Reactor to Reduce NOx Emissions from CIDI Engines," 1 page (Apr. 1999).

Optoelectronic Packaging Applications, March Plasma Systems, 2 pages (2002)—http://www.marchplasma.com/opto_app.htm.

Paglieri et al., "Palladium Alloy Composite Membranes for Hydrogen Separation," Abstract, Los Alamos National Library, 5 pages.

Peelamedu et al., "Anisothermal Reaction Synthesis of Garnets, Ferrites, And Spinels In Microwave Field," *Materials Research Bulletin* (36):2723-2739 (2001).

PerfectH2TM PE8000 Series, "Palladium Diffusion Hydrogen Purifier For High Flow Rate MOCVD Applications" Matheson Tri.Gas, 2 pages (2002).

Photonics Dictionary, "Definition for Word(s): Thyratron" (Laurin Publishing), 2 pages (1996-2003)—http://www.photonics.com/dictionary/lookup/lookup/asp?url=lookup&entrynum=538.

Pingel, V.J., "About What Every P/A Should Know About P/M," Powder Metallurgy Co., 9 pages—http://www.powdermetallurgyco.com/pm_about.htm.

Plasma Applications, Coalition for Plasma Science, 2 pages (1999, 2000)—http://www.plasmacoalition.org/applications.htm.

Plasma Carburizing, 1 page—http://www.ndkinc.co.jp/ndke04.html.

Plasma Direct Melting Furnace, Materials Magic, Hitachi Metals Ltd., 3 pages—http://www.hitachi-metals.co.jp/e/prod/prod07/p07_2_02.html.

Plasma Electronics, Classcical Plasma Applications, 2 pages (2002)—http://www.plasma.iinpe.br/English/Classical_Applications.htm.

Plasma Nitride Process Description, Northeast Coating Technologies, 2 pages.

Plasma Science and Technology, "Plasmas for Home, Business and Transportation," p. 4—http://www.plasmas.org/rot-home.htm.

Plasma-Assisted Catalyst Systems, Novel Plasma Catalysts Significantly Reduce NOx from Diesel Engines, 2 pages (Apr. 2001)—http://www.ott.doe.gov/success.html (2 pages).

Printed Circuit Board (PCB) Plasma Applications, March Plasma Systems, 2 pages (2002)—http://www.marchplasma.com/pcb_app.01.htm.

Roy et al., "Full Sintering of Powdered-Metal Bodies In A Microwave Field," *Nature*, vol. 399, pp. 668-670 (Jun. 17, 1999).

Roy et al., "Microwave Processing: Triumph of Applications-Driven Science in WC-Composites And Ferroic Titanates," *Ceramic Transactions*, vol. 80, pp. 3-26, (1997).

Roy et al., "Definitive Experimental Evidence for Microwave Effects: Radically New Effects of Separated E and H Fields, Such As Decrystallization of Oxides in Seconds," *Materials Research Innovations*, Springer-Verlag, vol. 6, No. 3, pp. 129-140 (2002).

Roy et al., "Major phase transformations and magnetic property changescaused by electromagnetic fields at microwave frequencies," *Journal Of Material Research*, 17:12, pp. 3008-3011 (2002).

Rusanov, V. D., Hydrogen Energy & Plasma Technologies Institute: Russian Research Centre Kurchatov Institute, 13 pages,—http://www.kiae.ru/eng/str/ihept/oiivept.htm.

Samant et al., "Glow Discharge Nitriding Al 6063 Samples and Study of Their Surface Hardness," Metallofizika I Noveishe Takhnologii, 23(3), pp. 325-333 (2001).

Sato et al., Surface Modification of Pure Iron by RF Plasma Nitriding with DC Bias Voltage Impression, *Hyomen Gijutsu* 48(3), pp. 317-323 (1997) (English Abstract).

Saveliev Y. "Effect of Cathode End Caps and a Cathode Emissive Surface on Relativistic Magnetron Opeartion," *IEEE Transactions on Plasma Science*, 28:3, pp. 478-484 (Jun. 2000).

SC/Tetra Engine Manifold Application, 2 pages (2001)—http://www.sctetra.com/applications/01_manifold.htm.

Shulman et al., "Microwaves In High-Temperature Processes," GrafTech, 8 pages (Mar. 2003) http://www.industrialheating.com/CDA/ArticleInformation/features/BNP__Features_Item/0.2832,94035,00.html.

Slone et al., "Nox Reduction For Lean Exhaust Using Plasma Assisted Catalysis," NOXTECH Inc., 5 pages (2000)—http://www.osti.gov/fcvt/deer2000/bhattpa.pdf.

Stockwell Rubber Company, Inc., "Conductive Silicone Rubber Compounds Product Selection Guide," Electrically Conducive Materials, 3 pages—http://www.stockwell.com/electrically_conducive_produc.htm.

Sumitomo Heavy Industries, Ltd., "Spark Plasma Sintering—What is Spark Plasma Sintering," 3 pages (2001)—http://www.shi.co.jp/sps/eng/.

Surface Hardening AHS Corp., 5 pages—http://www.ahscorp.com/surfaceh.html.

Takizawa et al. "Synthesis of inorganic materials by 28 GHz MW radiation," Proceed. Of The Symposium On Mw Effects And Applications, Aug. 2, 2001, Kokushikau Univ., Tokyo, Japan, pp. 52-53, (2001).

Taube et al. "Advances in Design of Microwave Resonance Plasma Source," American Institute of Chemical Engineering, 2004 Annual Meeting, Presentation (Nov. 2004).

testMAS: Pressure Sintering, 11 pages—http://cybercut.berkley.edu/mas2/processes/sinter_pressure.

The Amazing Metal Sponge: Simulations of Palladium-Hydride, Design of New Materials, 3 pages—http://www.psc.edu/science/Wolf/Wolf.html.

Toyota Motor Sales, "Emission Sub Systems—Catalytic Converter," 10 pages.

Uchikawa et al., "New Technique of Activating Palladium Surface for Absorption of Hydrogen or Deuterium," *Japanese Journal of Applied Physics*, vol. 32 (1993), pp. 5095-5096, Part 1, No. 11A (Nov. 1993).

Wang et al., "Densification of Al2O3 Powder Using Spark Plasma Sintering," *J. Mater. Res.*, 15:4, pp. 982-987 (Apr. 2000).

Way et al., "Palladium/Copper Allow Composite Membranes for High Temperature Hydrogen Separation from Coal-Derived Gas Streams," Dept. of Chemical Engineering, Colorado School of Mines, 3 pages (1999).

Welding Breakthrough: Generating and Handling a Microwave Powered Plasma, Australian Industry News, Information & Suppliers, 7 pages (Sep. 2001)—http://www.industry/search.com.au/features/microwave.asp.

Welding Plastic Parts, Business New Publishing Company, 4 pages (Nov. 2002)—http://www.assemblymag.com/Common/print_article.asp?rID=E455512C17534C31B96D.

Xie et al., "Effect of Rare Earth in Steel on Thermochemical Treatment," Xiuou Jinshu Cailiao Yu Gongcheng, 26(1), pp. 52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jun. 26, 2003, in PCT/US03/14037.
International Search Report issued on Jul. 8, 2003, in PCT/US03/14124.
International Search Report issued on Jun. 24. 2003, in PCT/US03/14132.
International Search Report issued on Jul. 29, 2003, in PCT/US03/14052.
International Search Report issued on Jul. 29, 2003, in PCT/US03/14054.
International Search Report issued on Apr. 27, 2004, in PCT/US03/14036.
International Search Report issued on Aug. 21, 2003, in PCT/US03/14053.
International Search Report issued on Feb. 8, 2004, in PCT/US03/14034.
International Search Report issued on Aug. 29, 2003, in PCT/US03/14039.
International Search Report issued on Aug. 21, 2003, in PCT/US03/14038.
International Search Report issued on Aug. 24, 2003, in PCT/US03/14133.
International Search Report issued on Jul. 28, 2003, in PCT/US03/14035.
International Search Report issued on Jun. 27, 2003, in PCT/US03/14040.
International Search Report issued on Jul. 17, 2003, in PCT/US03/14134.
International Search Report issued on Jun. 27, 2003, in PCT/US03/14122.
International Search Report issued on Jun. 24, 2003, in PCT/US03/14130.
International Search Report issued on Apr. 30, 2004, in PCT/US03/14055.
International Search Report issued on Apr. 30, 2004, in PCT/US03/140137.
International Search Report issued on Aug. 21, 2003, in PCT/US03/14123.
International Search Report issued on Jul. 29, 2003, in PCT/US03/14121.
International Search Report issued on Aug. 24, 2003, in PCT/US03/14136.
International Search Report issued on May 3, 2004, in PCT/US03/14135.
Written Opinion issued on Apr. 13, 2004, in PCT/US03/014037.
Examination Report issued on Feb. 24, 2004, in PCT/US03/14054.
Written Opinion issued on Dec. 22, 2003, in PCT/US03/14053.
Examination Report issued on Apr. 26, 2004, in PCT/US03/14053.
Written Opinion issued on Dec. 22, 2003, in PCT/US03/14123.
Examination Report issued on Apr. 26, 2004, in PCT/US03/14123.
Quayle Action issued on Apr. 19, 2005, in U.S. Appl. No. 10/449,600.

* cited by examiner

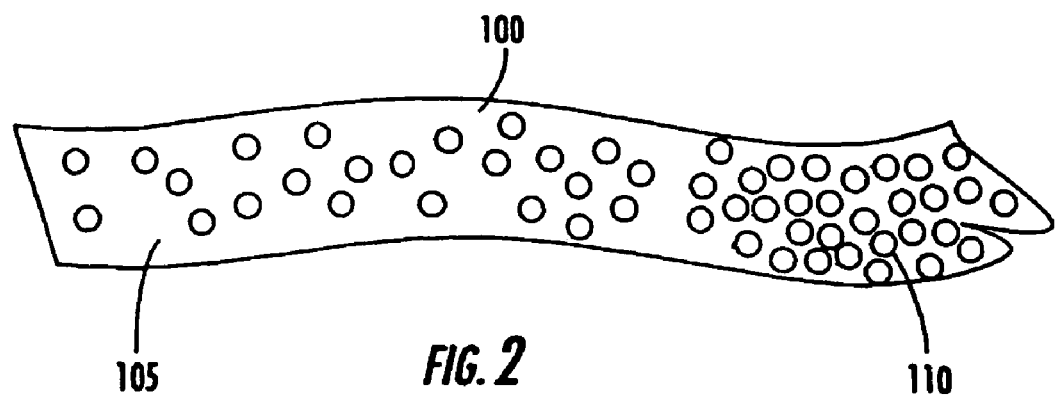
FIG. 2
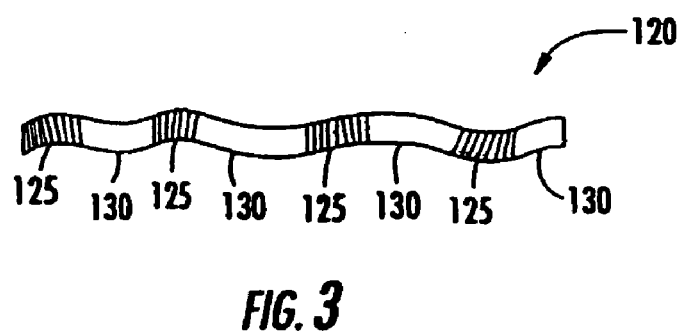
FIG. 3
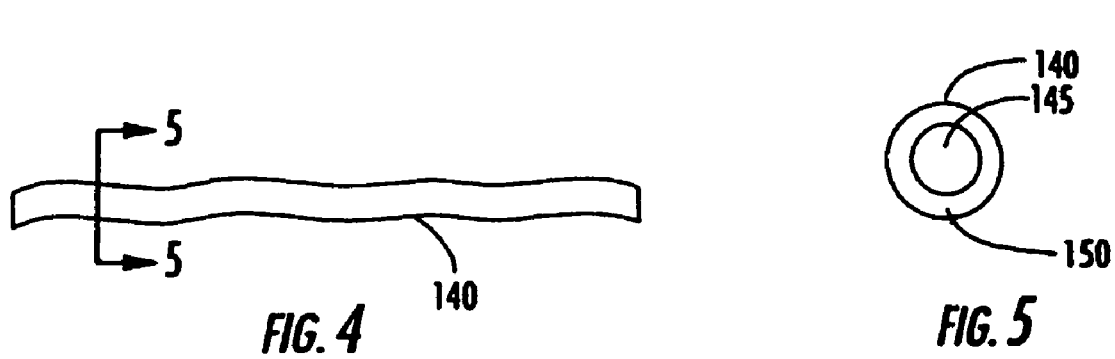
FIG. 4
FIG. 5

US 7,445,817 B2

PLASMA-ASSISTED FORMATION OF CARBON STRUCTURES

CROSS-REFERENCE OF RELATED APPLICATIONS

Priority is claimed to U.S. Provisional Patent Application No. 60/378,693, filed May 8, 2002, No. 60/430,677, filed Dec. 4, 2002, and No. 60/435,278, filed Dec. 23, 2002, all of which are hereby fully incorporated herein by reference.

FIELD OF THE INVENTION

This invention relates to methods and apparatus for plasma-assisted formation of carbon structures, and particularly for formation of carbon structures using an electromagnetic radiation-induced plasma with a plasma catalyst.

BACKGROUND

Formation of carbon structures (e.g., carbon nanotubes, $C_{60}$ fullerenes, diamond, etc.) can be accomplished in several ways. For example, $C_{60}$ molecules have been reportedly formed when carbon material is vaporized during application of a substantial amount of heat, such as by application of a flame or an electrical arc.

Single wall carbon nanotubes (SWCNTs) can also be formed by heating a carbon source, such as by laser ablation of a graphite target mixed with a metal catalyst. SWCNTs formation, unlike fullerene formation, can require a catalytic surface, such as a seeded substrate or a small amount of a metal catalyst (e.g., approximately one atomic percent Ni and Co), to provide a location for the SWCNTs to synthesize and grow.

Multiwall carbon nanotubes (MWCNTs) have also been reportedly formed by a chemical vapor deposition (CVD) technique using a vaporized catalyst to deposit MWCNTs on a substrate. More recently, techniques have been developed that reportedly grow nanotubes without catalytic surfaces.

Conventional techniques for growing carbon structures, however, are often difficult to control, since different structures of carbon are formed simultaneously, thereby making it difficult to preferentially synthesize a given structure of carbon without "contamination" by other carbon structures (e.g., by formation and collection of graphite particles/molecules during synthesis of SWCNTs).

Problems encountered while controlling the formation and growth of carbon structures, such as nanotubes and fullerenes can prevent the preferential growth of a carbon structure. For example, if carbon structures located on complex or temperature-sensitive substrates are desired, the heating processes can involve placing the entire substrate in a furnace and exposing it to high temperatures for extended periods of time, for example, 600 to 800 degrees Celsius for MWCNTs and 1,200 degrees Celsius for SWCNTs. Such temperature control, however, can be difficult to accurately generate and control.

As devices that incorporate carbon structures shrink, and their manufacture become more sensitive to environmental processing conditions, more flexible fabrication alternatives are needed, including methods that prevent damage during high temperature bulk heating treatments.

BRIEF SUMMARY OF A FEW ASPECTS OF THE INVENTION

Methods and apparatus for synthesizing structures of carbon atoms are provided. In one embodiment, a catalyzed plasma can be formed in a cavity by subjecting a gas to an amount of electromagnetic radiation in the presence of a plasma catalyst, adding a carbonaceous material to the plasma, and growing predetermined structures on a surface of a substrate. The radiation can have any frequency less than about 333 GHz.

In another embodiment, a plasma-assisted system for synthesizing predetermined carbon structures on substrates is provided. The system can include a vessel in which a cavity is formed, an electromagnetic radiation source configured to direct the radiation into the cavity during the synthesis, at least one gas source coupled to the cavity so that a gas conveying carbonaceous material can flow into the cavity during the synthesis, and at least one plasma catalyst located in the presence of the radiation (e.g., located in or near the cavity).

Plasma catalysts for initiating, modulating, and sustaining a plasma are also provided. A plasma catalyst may be passive or active. A passive plasma catalyst can include any object capable of inducing a plasma by deforming a local electric field (e.g., an electromagnetic field) consistent with this invention, without necessarily adding additional energy. An active plasma catalyst can be any particle or high energy wave packet capable of transferring a sufficient amount of energy to a gaseous atom or molecule to remove at least one electron from the gaseous atom or molecule in the presence of electromagnetic radiation. In both the passive and active cases, a plasma catalyst can improve, or relax, the environmental conditions required to ignite a plasma for performing various types of carbon structure synthesis.

Additional plasma catalysts, and methods and apparatus for igniting, modulating, and sustaining a plasma for the purpose of synthesizing a predetermined structure of carbon are also provided.

BRIEF DESCRIPTION OF THE DRAWINGS

Further aspects of the invention will be apparent upon consideration of the following detailed description, taken in conjunction with the accompanying drawings, in which like reference characters refer to like parts throughout, and in which:

FIG. 2 shows an illustrative plasma catalyst fiber with at least one component having a concentration gradient along its length consistent with this invention;

FIG. 3 shows an illustrative plasma catalyst fiber with multiple components at a ratio that varies along its length consistent with this invention;

FIG. 4 shows another illustrative plasma catalyst fiber that includes a core under layer and a coating consistent with this invention;

FIG. 5 shows a cross-sectional view of the plasma catalyst fiber of FIG. 4, taken from line 5-5 of FIG. 4, consistent with this invention;

DETAILED DESCRIPTION OF THE EMBODIMENTS

This invention can relate to methods and apparatus for initiating, modulating, and sustaining a plasma for synthesis of a variety of carbon-structures, including, for example, forming carbon nanotubes and other carbon structures. Thus, this invention can be used to facilitate control of plasma-assisted formation of carbon structures that may lower energy costs and increase carbon-structure synthesis, growth, and manufacturing flexibility.

One illustrative method of synthesizing carbon structures consistent with this invention can include adding a gas, a plasma catalyst, and electromagnetic radiation to a cavity for catalyzing a plasma. As used herein, any plasma formed with a plasma catalyst for the purpose of forming carbon structures on one or more objects is a "catalyzed plasma," or more simply, "a plasma." The catalyst can be passive or active. A passive plasma catalyst can include any object capable of inducing a plasma by deforming a local electric field (e.g., an electromagnetic field) consistent with this invention without necessarily adding additional energy through the catalyst, such as by applying a voltage to create a spark. An active plasma catalyst, on the other hand, may be any particle or high energy wave packet capable of transferring a sufficient amount of energy to a gaseous atom or molecule to remove at least one electron from the gaseous atom or molecule in the presence of electromagnetic radiation.

The following commonly owned, concurrently filed U.S. patent applications are hereby incorporated by reference in their entireties: U.S. patent application Ser. No. 10/513,221; U.S. patent application Ser. No. 10/513,393; PCT Application No. US03/14132, now expired; U.S. patent application Ser. No. 10/513,394; U.S. patent application Ser. No. 10/513,305; U.S. patent application Ser. No. 10/513,607; U.S. patent application Ser. No. 10/449,600; PCT Application No. US03/14034, now expired; U.S. patent application Ser. No. 10/430,416; U.S. patent Ser. No. 10/430,415; PCT Application No. US03/14133; now expired; U.S. patent application Ser. No. 10/513,606; U.S. patent application Ser. No. 10/513,220; PCT Application No. US0314122, now expired; U.S. patent application Ser. No. 10/513,397; U.S. patent application Ser. No. 10/513,605; PCT Application No. US03/14137, now expired; U.S. patent application Ser. No. 10/430,426; PCT Application No. US03/14121, now expired; U.S. patent application Ser. No. 10/513,604; and PCT Application No. US03/14135, now expired.

Illustrative Plasma System

Figure 1:
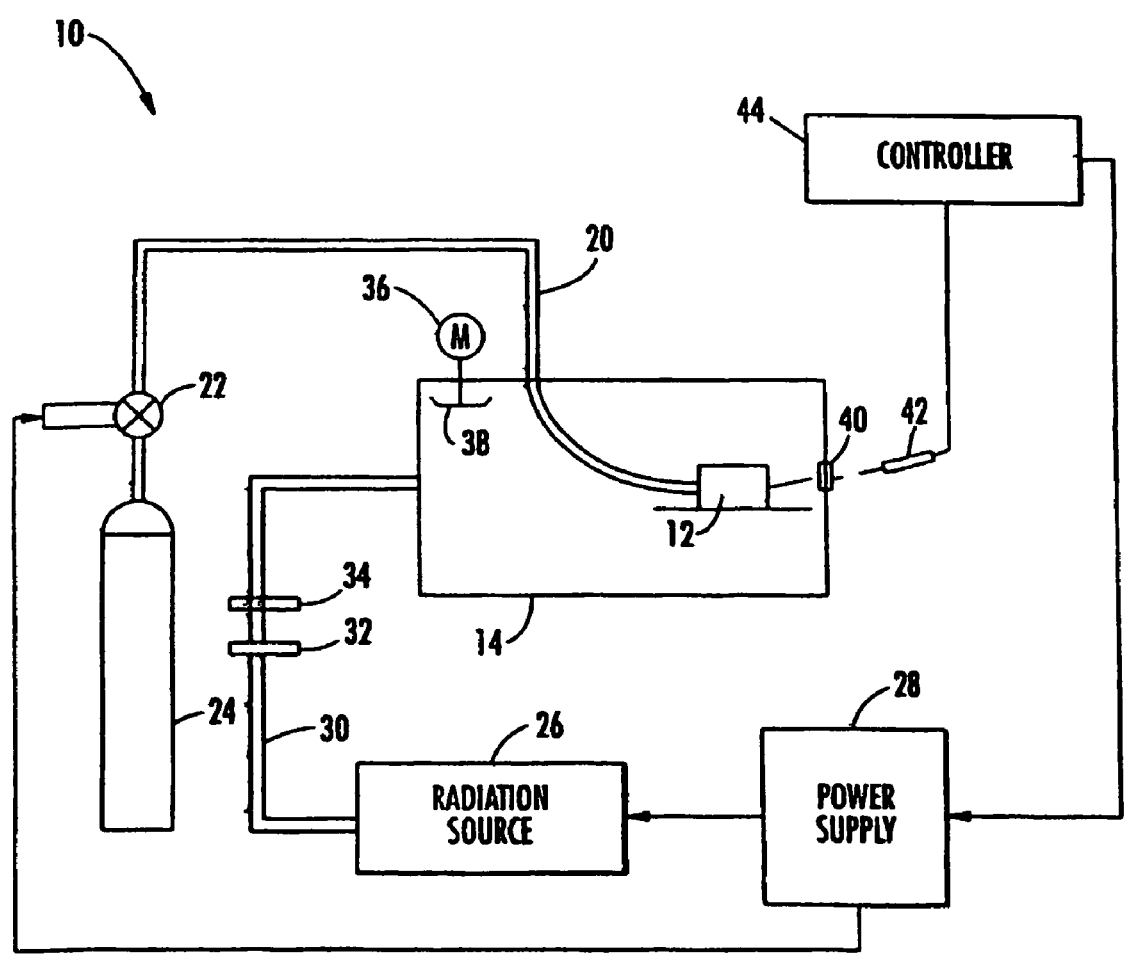
FIG. 1 shows a schematic diagram of an illustrative plasma-assisted system for synthesizing carbon structures consistent with this invention.

FIG. 1 shows illustrative plasma-assisted carbon structure synthesis and growth system 10 consistent with one aspect of this invention. In this embodiment, cavity 12 can be formed in a vessel positioned inside electromagnetic radiation chamber (i.e., applicator) 14. In another embodiment (not shown), vessel 12 and electromagnetic radiation chamber 14 are the same, thereby eliminating the need for two separate components. The vessel in which cavity 12 is formed can include one or more electromagnetic radiation-transmissive insulating layers to improve its thermal insulation properties without significantly shielding cavity 12 from the electromagnetic radiation.

In one embodiment, cavity 12 is formed in a vessel made of ceramic. Due to the extremely high temperatures that can be achieved with plasmas consistent with this invention, the upper temperature limit for processing is restricted only by the melting point of the ceramic used to make the vessel. In one experiment, for example, a ceramic capable of withstanding about 3,000 degrees Fahrenheit was used. For example, the ceramic material can include, by weight, 29.8% silica, 68.2% alumina, 0.4% ferric oxide, 1% titania, 0.1% lime, 0.1% magnesia, 0.4% alkalis, which is sold under Model No. LW-30 by New Castle Refractories Company, of New Castle, Pa. It will be appreciated by those of ordinary skill in the art, however, that other materials, such as quartz, and those different (e.g., those having higher or lower melting temperatures) from the ceramic material described above, can also be used consistent with the invention.

In one successful experiment, a plasma was formed in a partially open cavity inside a first brick and topped with a second brick. The cavity had dimensions of about 2 inches by about 2 inches by about 1.5 inches. At least two holes were also provided in the brick in communication with the cavity: one for viewing the plasma and at least one hole for providing the gas. The size of the cavity can depend on the desired plasma process being performed. Also, the cavity should at least be configured to prevent the plasma from rising/floating away from the primary processing region, even though the plasma may not contact the substrate.

Cavity 12 can be connected to one or more gas sources 24 (e.g., a source of argon, nitrogen, hydrogen, xenon, krypton, a carbon-containing gas (e.g., hydrocarbon), etc.) by line 20 and control valve 22, which may be powered by power supply 28. Line 20 may be tubing (e.g., between about 1/16 inch and about 1/4 inch, such as about 1/8"), but could be any device capable of supplying gas. Also if desired, a vacuum pump can be connected to the chamber to remove any undesirable contaminants that may be generated during plasma processing.

A radiation leak detector (not shown) was installed near source 26 and waveguide 30 and connected to a safety interlock system to automatically turn off the electromagnetic radiation power supply if a leak above a predefined safety limit, such as one specified by the FCC and/or OSHA (e.g., 5 mW/cm$^2$), was detected.

Electromagnetic radiation source 26, which can be powered by electrical power supply 28, can direct electromagnetic radiation into chamber 14 through one or more waveguides 30. It will be appreciated by those of ordinary skill in the art that electromagnetic source 26 can be connected directly to chamber 14 or cavity 12, thereby eliminating waveguide 30. The electromagnetic radiation entering chamber 14 or cavity 12 is used to ignite a plasma within the cavity. This catalyzed plasma can be substantially modulated or sustained and confined to the cavity by coupling additional electromagnetic radiation with the catalyst.

Electromagnetic radiation can be supplied through circulator 32 and tuner 34 (e.g., 3-stub tuner). Tuner 34 can be used to minimize the reflected power as a function of changing ignition or processing conditions, especially before the catalyzed plasma has formed because electromagnetic radiation will be strongly absorbed by the plasma after its formation.

As explained more fully below, the location of electromagnetic radiation-transmissive cavity 12 in chamber 14 may not be critical if chamber 14 supports multiple modes, and especially when the modes are continually or periodically mixed. As also explained more fully below, motor 36 can be connected to mode-mixer 38 for making the time-averaged electromagnetic radiation energy distribution substantially uniform throughout chamber 14. Furthermore, window 40 (e.g., a quartz window) can be disposed in one wall of chamber 14 adjacent to cavity 12, permitting temperature sensor 42 (e.g., an optical pyrometer) to be used to view a process inside cavity 12. In one embodiment, the optical pyrometer output can increase from zero volts as the temperature rises to within the tracking range. The pyrometer can be used to sense radiant intensities at two or more wavelengths and to fit those intensities using Planck's law to determine the temperature of the work piece.

Plasma temperatures can also be estimated from optical emission intensities for two or more transitions in an atomic or molecular species present in the plasma. Known probabilities for these transitions can be used to estimate an excited state population distribution and Boltzman's law can be used to estimate a temperature of the species from this information.

Sensor 42 can develop output signals as a function of the temperature or any other monitorable condition associated with a work piece (not shown) within cavity 12 and provide the signals to controller 44. As mentioned below, dual-temperature sensing and heating, as well as automated cooling rate and gas flow controls can also be used. Controller 44 in turn can be used to control operation of power supply 28, which can have one output connected to electromagnetic radiation source 26 as described above, and another output connected to valve 22 to control gas flow into cavity 12.

The invention has been practiced with equal success employing electromagnetic radiation sources at both 915 MHz and 2.45 GHz, provided by Communications and Power Industries (CPI), although radiation having any frequency less than about 333 GHz can be used. The 2.45 GHz system provided continuously variable electromagnetic radiation power from about 0.5 kilowatts to about 5.0 kilowatts. Consistent with one embodiment of the present invention, the electromagnetic radiation power density during synthesis of carbon structures may be between about 0.05 W/cm$^3$ and about 100 W/cm$^3$, for example, at about 2.5 W/cm$^3$. A 3-stub tuner allowed impedance matching for maximum power transfer and a dual-directional coupler (not shown) was used to measure forward and reflected powers. Also, optical pyrometers can be used for remote sensing of the substrate temperature.

As mentioned above, radiation having any frequency less than about 333 GHz can be used consistent with this invention. For example, frequencies, such as power line frequencies (about 50 Hz to about 60 Hz), can be used, although the pressure of the gas from which the plasma is formed may be lowered to assist with plasma ignition. Also, any radio frequency or microwave frequency can be used consistent with this invention, including frequencies greater than about 100 kHz. In most cases, the gas pressure for such relatively high frequencies need not be lowered to ignite, modulate, or sustain a plasma, thereby enabling many plasma-processes to occur at atmospheric pressures and above.

The equipment was computer controlled using LabVIEW® 6i software, which provided real-time temperature monitoring and electromagnetic radiation power control. LabVIEW® graphical development environment was used to automate data acquisition, instrument control, measurement analysis, and data presentation. LabVIEW® is available from the National Instruments Corporation, of Austin, Tex.

Noise was reduced by using sliding averages of suitable number of data points. Also, to improve speed and computational efficiency, the number of stored data points in the buffer array were limited using shift-registers and buffer sizing techniques. The pyrometer measured the temperature of a sensitive area of about 1 cm$^2$, which was used to calculate an average temperature. The pyrometer sensed radiant intensities at two wavelengths and fit those intensities using Planck's law to determine the temperature. It will be appreciated, however, that other devices and methods for monitoring and controlling temperature are also available and can be used consistent with this invention. Control software that can be used consistent with this invention is described, for example, in commonly owned, concurrently filed PCT Application No. US03/14135, now expired which is hereby fully incorporated by reference.

Chamber 14 had several glass-covered viewing ports with electromagnetic radiation shields and one quartz window for pyrometer access. Several ports for connection to a vacuum pump and a gas source were also provided, although not necessarily used.

System 10 also included a closed-loop de-ionized water cooling system (not shown) with an external heat exchanger cooled by tap water. During operation, the de-ionized water first cooled the magnetron, then the load-dump in the circulator (used to protect the magnetron), and finally the electromagnetic radiation chamber through water channels welded on the outer surface of the chamber.

Plasma Catalysts

As mentioned previously, a plasma catalyst consistent with this invention can include one or more different materials and may be either passive or active. A plasma catalyst can be used, among other things, to ignite, modulate, and/or sustain a plasma at a gas pressure that is less than, equal to, or greater than atmospheric pressure.

One method of forming a plasma consistent with this invention can include subjecting a gas in a cavity to electromagnetic radiation having a frequency less than about 333 GHz in the presence of a passive plasma catalyst. A passive plasma catalyst consistent with this invention can include any object capable of inducing a plasma by deforming a local electric field (e.g., an electromagnetic field) consistent with this invention, without necessarily adding additional energy through the catalyst, such as by applying an electric voltage to create a spark.

A passive plasma catalyst consistent with this invention can also be a nanoparticle or a nanotube. As used herein, the term "nanoparticle" can include any particle having a maximum physical dimension less than about 100 nm that is at least electrically semi-conductive. Also, both SWCNTs and MWCNTs, doped and undoped, can be particularly effective for igniting plasmas consistent with this invention because of their exceptional electrical conductivity and elongated shape. The nanotubes can have any convenient length and can be a powder fixed to a substrate. If fixed, the nanotubes can be oriented randomly on the surface of the substrate or fixed to the substrate (e.g., at some predetermined orientation) while the plasma is ignited or sustained.

A passive plasma catalyst can also be a powder consistent with this invention, and need not be made of nanoparticles or nanotubes. It can be formed, for example, from fibers, dust particles, flakes, sheets, etc. When in powder form, the catalyst can be suspended, at least temporarily, in a gas. By suspending the powder in the gas, the powder can be quickly dispersed throughout the cavity and more easily consumed, if desired.

Figure 1A:
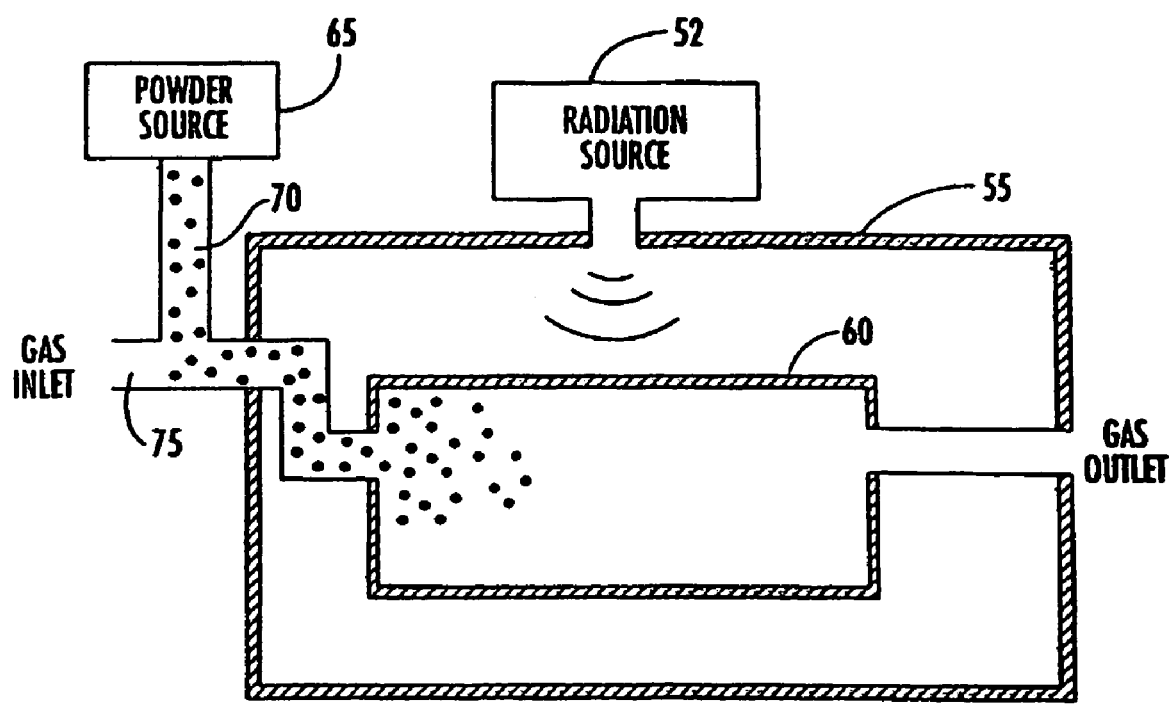
FIG. 1A shows an illustrative embodiment of a portion of a plasma-assisted system for synthesizing carbon structures and for adding a powder plasma catalyst to a plasma cavity for igniting, modulating, or sustaining a plasma in a cavity consistent with this invention.

In one embodiment, the powder catalyst can be carried into the cavity and at least temporarily suspended with a carrier gas. The carrier gas can be the same or different from the gas that forms the plasma. Also, the powder can be added to the gas prior to being introduced to the cavity. For example, as shown in FIG. 1A, electromagnetic radiation source 52 can supply radiation to electromagnetic radiation cavity 55, in which plasma cavity 60 is placed. Powder source 65 provides catalytic powder 70 into gas stream 75. In an alternative embodiment, powder 70 can be first added to cavity 60 in bulk (e.g., in a pile) and then distributed in the cavity in any number of ways, including flowing a gas through or over the bulk powder. In addition, the powder can be added to the gas for igniting, modulating, or sustaining a coating plasma by moving, conveying, drizzling, sprinkling, blowing, or otherwise, feeding the powder into or within the cavity.

In one experiment, a plasma was ignited in a cavity by placing a pile of carbon fiber powder in a copper pipe that extended into the cavity. Although sufficient electromagnetic (microwave) radiation was directed into the cavity, the copper pipe shielded the powder from the radiation and no plasma ignition took place. However, once a carrier gas began flowing through the pipe, forcing the powder out of the pipe and into the cavity, and thereby subjecting the powder to the electromagnetic radiation, a plasma was nearly instantaneously ignited in the cavity.

A powder plasma catalyst consistent with this invention can be substantially non-combustible, thus it need not contain oxygen, or burn in the presence of oxygen. Thus, as mentioned above, the catalyst can include a metal, carbon, a carbon-based alloy, a carbon-based composite, an electrically conductive polymer, a conductive silicone elastomer, a polymer nanocomposite, an organic-inorganic composite, and any combination thereof.

Also, powder catalysts can be substantially uniformly distributed in the plasma cavity (e.g., when suspended in a gas), and plasma ignition can be precisely controlled within the cavity. Uniform ignition can be important in certain applications, including those applications requiring brief plasma exposures, such as in the form of one or more bursts. Still, a certain amount of time can be required for a powder catalyst to distribute itself throughout a cavity, especially in complicated, multi-chamber cavities. Therefore, consistent with another aspect of this invention, a powder catalyst can be introduced into the cavity through a plurality of ignition ports to more rapidly obtain a more uniform catalyst distribution therein (see below).

In addition to powder, a passive plasma catalyst consistent with this invention can include, for example, one or more microscopic or macroscopic fibers, sheets, needles, threads, strands, filaments, yarns, twines, shavings, slivers, chips, woven fabrics, tape, whiskers, or any combination thereof. In these cases, the plasma catalyst can have at least one portion with one physical dimension substantially larger than another physical dimension. For example, the ratio between at least two orthogonal dimensions should be at least about 1:2, but could be greater than about 1:5, or even greater than about 1:10.

Thus, a passive plasma catalyst can include at least one portion of material that is relatively thin compared to its length. A bundle of catalysts (e.g., fibers) may also be used and can include, for example, a section of graphite tape. In one experiment, a section of tape having approximately thirty thousand strands of graphite fiber, each about 2-3 microns in diameter, was successfully used. The number of fibers in and the length of a bundle are not critical to igniting, modulating, or sustaining the plasma. For example, satisfactory results have been obtained using a section of graphite tape about one-quarter inch long. One type of carbon fiber that has been successfully used consistent with this invention is sold under the trademark Magnamite®, Model No. AS4CGP3K, by the Hexcel Corporation of Salt Lake City, Utah. Also, silicon-carbide fibers have been successfully used.

A passive plasma catalyst consistent with another aspect of this invention can include one or more portions that are, for example, substantially spherical, annular, pyramidal, cubic, planar, cylindrical, rectangular or elongated.

The passive plasma catalysts discussed above include at least one material that is at least electrically semi-conductive. In one embodiment, the material can be highly conductive. For example, a passive plasma catalyst consistent with this invention can include a metal, an inorganic material, carbon, a carbon-based alloy, a carbon-based composite, an electrically conductive polymer, a conductive silicone elastomer, a polymer nanocomposite, an organic-inorganic composite, or any combination thereof. Some of the possible inorganic materials that can be included in the plasma catalyst include carbon, silicon carbide, molybdenum, platinum, tantalum, tungsten, carbon nitride, and aluminum, although other electrically conductive inorganic materials are believed to work just as well.

In addition to one or more electrically conductive materials, a passive plasma catalyst consistent with this invention can include one or more additives (which need not be electrically conductive). As used herein, the additive can include any material that a user wishes to add to the plasma. For example, as discussed in greater detail below, one or more carbonaceous materials can be added to the plasma through the catalyst for growing predetermined carbon structures on semiconductors and other substrate materials. The catalyst can include the carbonaceous material itself, or it can include a precursor material that, upon decomposition, can form a source of carbon for synthesis. Thus, the plasma catalyst can include one or more additives and one or more electrically conductive materials in any desirable ratio, depending on the ultimate desired composition of the plasma and the process using the plasma.

The ratio of the electrically conductive components to the additives in a passive plasma catalyst can vary over time while being consumed for example, during ignition, the plasma catalyst could desirably include a relatively large percentage of electrically conductive components to improve the ignition conditions. On the other hand, if used while sustaining the plasma, the catalyst could include a relatively large percentage of additives or carbonaceous material. It will be appreciated by those of ordinary skill in the art that the component ratio of the plasma catalyst used to ignite and sustain the plasma could be the same and that the ratio can be customized to convey any desired carbon composition.

A predetermined ratio profile can be used to simplify many plasma-assisted carbon-structure formation processes. In some conventional processes, the components within the plasma are added as necessary, but such addition normally requires programmable equipment to add the components according to a predetermined schedule. However, consistent with this invention, the ratio of components in the catalyst can be varied, and thus the ratio of components in the plasma itself can be automatically varied. That is, the ratio of components in the plasma at any particular time can depend on which of the catalyst portions is currently being consumed by the plasma. Thus, the catalyst component ratio can be different at different locations within the catalyst. And, the current ratio of components in a plasma can depend on the portions of the catalyst currently and/or previously consumed, especially when the flow rate of a gas passing through the plasma chamber is relatively slow.

A passive plasma catalyst consistent with this invention can be homogeneous, inhomogeneous, or graded. Also, the plasma catalyst component ratio can vary continuously or discontinuously throughout the catalyst. For example, in FIG. 2, the ratio can vary smoothly forming a gradient along a length of catalyst 100. Catalyst 100 can include a strand of material that includes a relatively low concentration of a component at section 105 and a continuously increasing concentration toward section 110.

Alternatively, as shown in FIG. 3, the ratio can vary discontinuously in each portion of catalyst 120, which includes, for example, alternating sections 125 and 130 having different concentrations. It will be appreciated that catalyst 120 can have more than two section types. Thus, the catalytic component ratio being consumed by the plasma can vary in any predetermined fashion. In one embodiment, when the plasma is monitored and a particular additive is detected, further processing can be automatically commenced or terminated.

Another way to vary the ratio of components in a sustained plasma is by introducing multiple catalysts having different component ratios at different times or different rates. For example, multiple catalysts can be introduced at approximately the same location or at different locations within the cavity. When introduced at different locations, the plasma formed in the cavity can have a component concentration gradient determined by the locations of the various catalysts. Thus, an automated system can include a device by which a consumable plasma catalyst is mechanically inserted before and/or during plasma igniting, modulating, and/or sustaining.

A passive plasma catalyst consistent with this invention can also be coated. In one embodiment, a catalyst can include a substantially non-electrically conductive coating deposited on the surface of a substantially electrically conductive material. Alternatively, the catalyst can include a substantially electrically conductive coating deposited on the surface of a substantially electrically non-conductive material. FIGS. 4 and 5, for example, show fiber 140, which includes under layer 145 and coating 150. In one embodiment, a plasma catalyst including a carbon core can be coated with nickel to prevent oxidation of the carbon.

A single plasma catalyst can also include multiple coatings. If the coatings are consumed during contact with the plasma, the coatings could be introduced into the plasma sequentially, from the outer coating to the innermost coating, thereby creating a time-release mechanism. Thus, a coated plasma catalyst can include any number of materials, as long as a portion of the catalyst is at least electrically semi-conductive.

Consistent with another embodiment of this invention, a plasma catalyst can be located entirely within an electromagnetic radiation chamber to substantially reduce or prevent electromagnetic radiation energy leakage. In this way, the plasma catalyst does not electrically or magnetically couple with the radiation chamber, the vessel containing the cavity, or to any electrically conductive object outside the chamber. This can prevent sparking at the ignition port and prevents electromagnetic radiation from leaking outside the chamber during the ignition and possibly later if the plasma is sustained. In one embodiment, the catalyst can be located at a tip of a substantially electrically non-conductive extender that extends through an ignition port.

Figure 6:
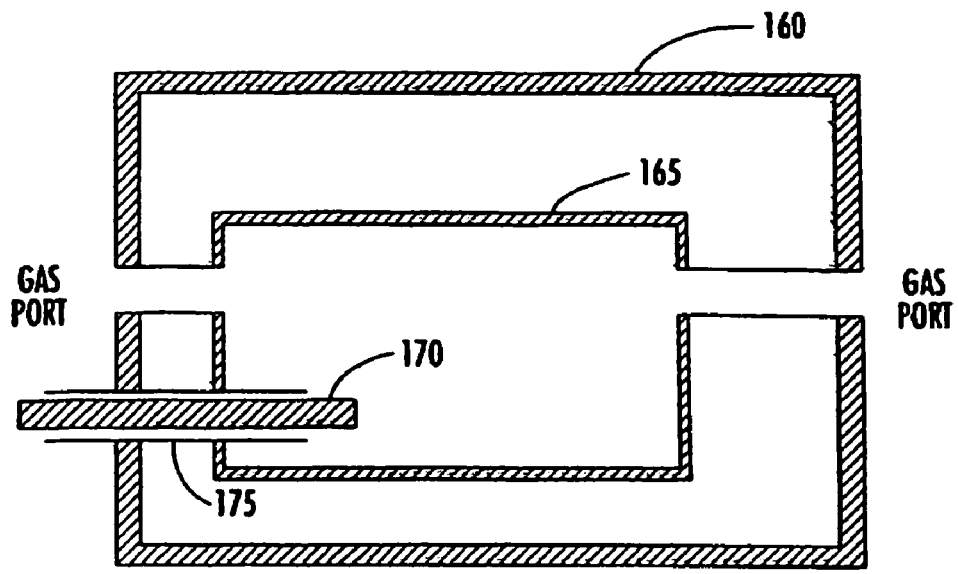
FIG. 6 shows an illustrative embodiment of another portion of a plasma system for synthesizing carbon structures, including an elongated plasma catalyst that extends through an ignition port consistent with this invention.
Figure 7:
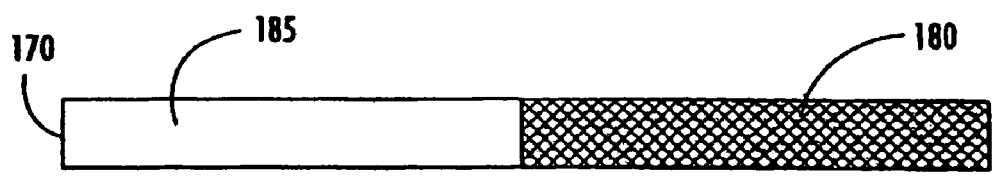
FIG. 7 shows an illustrative embodiment of an elongated plasma catalyst that can be used in the system of FIG. 6 consistent with this invention.

FIG. 6, for example, shows electromagnetic radiation chamber 160 in which plasma cavity 165 can be placed. Plasma catalyst 170 can be elongated and extends through ignition port 175. As shown in FIG. 7, and consistent with this invention, catalyst 170 can include electrically conductive distal portion 180 (which is placed in chamber 160) and electrically non-conductive portion 185 (which is placed substantially outside chamber 160, but may extend somewhat into the chamber). This configuration prevents an electrical connection (e.g., sparking) between distal portion 180 and chamber 160.

Figure 8:
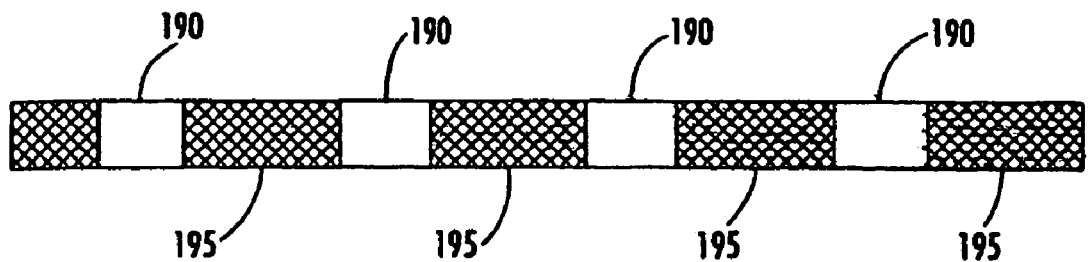
FIG. 8 shows another illustrative embodiment of an elongated plasma catalyst that can be used in the system of FIG. 6 consistent with this invention.

In another embodiment, shown in FIG. 8, the catalyst can be formed from a plurality of electrically conductive segments 190 separated by and mechanically connected to a plurality of electrically nonconductive segments 195. In this embodiment, the catalyst can extend through the ignition port between a point inside the cavity and another point outside the cavity, but the electrically discontinuous profile significantly prevents sparking and energy leakage.

Another method of forming a plasma consistent with this invention includes subjecting a gas in a cavity to electromagnetic radiation having a frequency less than about 333 GHz in the presence of an active plasma catalyst, which generates or includes at least one ionizing particle.

An active plasma catalyst consistent with this invention can be any particle or high energy wave packet capable of transferring a sufficient amount of energy to a gaseous atom or molecule to remove at least one electron from the gaseous atom or molecule in the presence of electromagnetic radiation. Depending on the source, the ionizing particles can be directed into the cavity in the form of a focused or collimated beam, or they may be sprayed, spewed, sputtered, or otherwise introduced.

Figure 9:
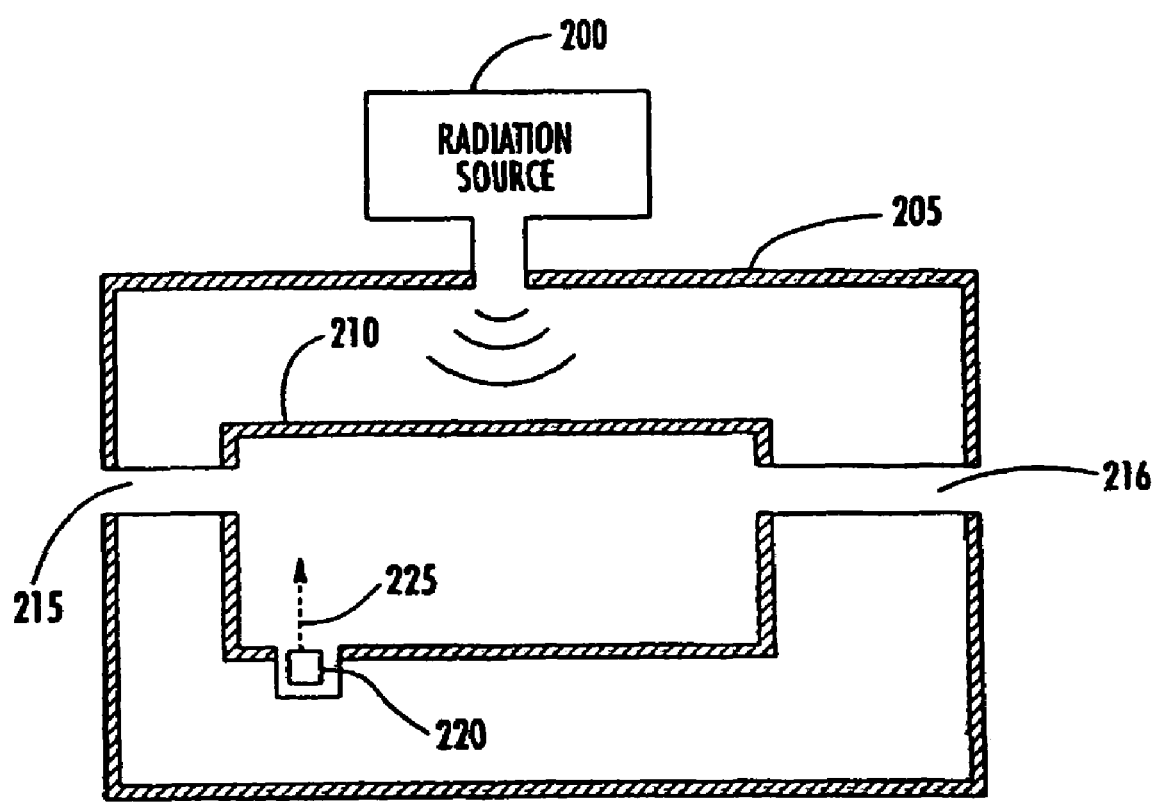
FIG. 9 shows an illustrative embodiment of a portion of a plasma-assisted system for synthesizing carbon structures and for directing an active plasma catalyst, in the form of ionizing radiation, into a radiation chamber consistent with this invention.

For example, FIG. 9 shows electromagnetic radiation source 200 directing radiation into electromagnetic radiation chamber 205. Plasma cavity 210 can be positioned inside of chamber 205 and may permit a gas to flow therethrough via ports 215 and 216. Source 220 can direct ionizing particles 225 into cavity 210. Source 220 can be protected by a metallic screen which allows the ionizing particles to go through, but shields source 220 from electromagnetic radiation. If necessary, source 220 can be water-cooled.

Examples of ionizing particles consistent with this invention can include x-ray particles, gamma ray particles, alpha particles, beta particles, neutrons, protons, and any combination thereof. Thus, an ionizing particle catalyst can be charged (e.g., an ion from an ion source) or uncharged and can be the product of a radioactive fission process. In one embodiment, the vessel in which the plasma cavity is formed could be entirely or partially transmissive to the ionizing particle catalyst. Thus, when a radioactive fission source is located outside the cavity, the source can direct the fission products through the vessel to ignite the plasma. The radioactive fission source can be located inside the electromagnetic radiation chamber to substantially prevent the fission products (i.e., the ionizing particle catalyst) from creating a safety hazard.

In another embodiment, the ionizing particle can be a free electron, but it need not be emitted in a radioactive decay process. For example, the electron can be introduced into the cavity by energizing the electron source (such as a metal), such that the electrons have sufficient energy to escape from the source. The electron source can be located inside the cavity, adjacent the cavity, or even in the cavity wall. It will be appreciated by those of ordinary skill in the art that the any combination of electron sources is possible. A common way to produce electrons is to heat a metal, and these electrons can be further accelerated by applying an electric field.

In addition to electrons, free energetic protons can also be used to catalyze a plasma. In one embodiment, a free proton can be generated by ionizing hydrogen and, optionally, accelerated with an electric field.

Multi-mode Electromagnetic Radiation Cavities

Electromagnetic radiation waveguides, cavities, and chambers can be designed to support or facilitate propagation of at least one electromagnetic radiation mode. As used herein, the term "mode" refers to a particular pattern of any standing or propagating electromagnetic wave that satisfies Maxwell's equations and the applicable boundary conditions (e.g., of the cavity). In a waveguide, or cavity, the mode can be any one of the various possible patterns of propagating or standing electromagnetic fields. Each mode is characterized by its frequency and polarization of the electric field and/or magnetic field vectors. The electromagnetic field pattern of a mode depends on the frequency, refractive indices or dielectric constants, and waveguide or cavity geometry.

A transverse electric (TE) mode is one whose electric field vector is normal to the direction of propagation. Similarly, a transverse magnetic (TM) mode is one whose magnetic field vector is normal to the direction of propagation. A transverse electric and magnetic (TEM) mode is one whose electric and magnetic field vectors are both normal to the direction of propagation. A hollow metallic waveguide does not typically support a normal TEM mode of electromagnetic radiation propagation. Even though electromagnetic radiation appears to travel along the length of a waveguide, it may do so only by reflecting off the inner walls of the waveguide at some angle. Hence, depending upon the propagation mode, the electromagnetic radiation may have either some electric field component or some magnetic field component along the axis of the waveguide (often referred to as the z-axis).

The actual field distribution inside a cavity or waveguide is a superposition of the modes therein. Each of the modes can be identified with one or more subscripts (e.g., $TE_{10}$ ("tee ee one zero"). The subscripts normally specify how many "half waves" at the guide wavelength are contained in the x and y directions. It will be appreciated by those skilled in the art that the guide wavelength can be different from the free space wavelength because electromagnetic radiation propagates inside the waveguide by reflecting at some angle from the inner walls of the waveguide. In some cases, a third subscript can be added to define the number of half waves in the standing wave pattern along the z-axis.

For a given electromagnetic radiation frequency, the size of the waveguide can be selected to be small enough so that t can support a single propagation mode. In such a case, the system is called a single-mode system (i.e., a single-mode applicator). The $TE_{10}$ mode is usually dominant in a rectangular single-mode waveguide. In addition to waveguides, it will be appreciated that coaxial cables and radiative antennas can be used.

As the size of the waveguide (or the cavity to which the waveguide is connected) increases, the waveguide or applicator can sometimes support additional higher order modes forming a multi-mode system. When many modes are capable of being supported simultaneously, the system is often referred to as highly moded.

A simple, single-mode system has a field distribution that includes at least one maximum and/or minimum. The magnitude of a maximum largely depends on the amount of electromagnetic radiation supplied to the system. Thus, the field distribution of a single mode system is strongly varying and substantially non-uniform.

Unlike a single-mode cavity, a multi-mode cavity can support several propagation modes simultaneously, which, when superimposed, results in a complex field distribution pattern. In such a pattern, the fields tend to spatially smear and, thus, the field distribution usually does not show the same types of strong minima and maxima field values within the cavity. In addition, as explained more fully below, a mode-mixer can be used to "stir" or "redistribute" modes (e.g., by mechanical movement of an electromagnetic radiation reflector). This redistribution desirably provides a more uniform time-averaged field (and therefore plasma) distribution within the cavity.

A multi-mode cavity consistent with this invention can support at least two modes, and may support many more than two modes. Each mode has a maximum electric field vector. Although there may be two or more modes, one mode may be dominant and has a maximum electric field vector magnitude that is larger than the other modes. As used herein, a multi-mode cavity may be any cavity in which the ratio between the first and second mode magnitudes is less than about 1:10, or less than about 1:5, or even less than about 1:2. It will be appreciated by those of ordinary skill in the art that the smaller the ratio, the more distributed the electric field energy between the modes, and hence the more distributed the electromagnetic radiation energy is in the cavity.

The distribution of a plasma within a cavity may strongly depend on the distribution of the applied electromagnetic radiation. For example, in a pure single mode system, there may only be a single location at which the electric field is a maximum. Therefore, a strong plasma may only form at that single location. In many applications, such a strongly localized plasma could undesirably lead to non-uniform plasma treatment or heating (i.e., localized overheating and underheating).

Whether or not a single or multi-mode cavity is used to grow carbon structures consistent with this invention, it will be appreciated by those of ordinary skill in the art that the cavity in which the plasma is formed can be completely closed or partially open. In other applications, however, it may be desirable to flow a gas through the cavity, and therefore the cavity must be open to some degree. In this way, the flow, type, and pressure of the flowing gas can be varied over time. This may be desirable because certain gases, which can facilitate the formation of a plasma (e.g., argon), are easier to ignite but may not be needed during subsequent plasma processing.

Mode-mixing

For many applications involving synthesis of carbon structures, a cavity containing a uniform plasma is desirable. However, because electromagnetic radiation can have a relatively long wavelength (e.g., in the case of microwave radiation, several tens of centimeters), obtaining a uniform distribution can be difficult to achieve. As a result, consistent with one aspect of this invention, the radiation modes in a multi-mode cavity can be mixed, or redistributed, over a period of time. Because the field distribution within the cavity must satisfy all of the boundary conditions set by the inner surface of the cavity, those field distributions can be changed by changing the position of any portion of that inner surface.

In one embodiment consistent with this invention, a movable reflective surface can be located inside the electromagnetic radiation cavity. The shape and motion of the reflective surface should, when combined, change the inner surface of the cavity during motion. For example, an "L" shaped metallic object (i.e., "mode-mixer") when rotated about any axis will change the location or the orientation of the reflective surfaces in the cavity and therefore change the electromagnetic radiation distribution therein. Any other asymmetrically shaped object can also be used (when rotated), but symmetrically shaped objects can also work, as long as the relative motion (e.g., rotation, translation, or a combination of both) causes some change in the location or orientation of the reflective surfaces. In one embodiment, a mode-mixer can be a cylinder that can be rotated about an axis that is not the cylinder's longitudinal axis.

Each mode of a multi-mode cavity may have at least one maximum electric field vector, but each of these vectors could occur periodically across the inner dimension of the cavity. Normally, these maxima are fixed, assuming that the frequency of the electromagnetic radiation does not change. However, by moving a mode-mixer such that it interacts with the electromagnetic radiation, it is possible to move the positions of the maxima. For example, mode-mixer 38 can be used to optimize the field distribution within cavity 12 such that the plasma ignition conditions and/or the plasma sustaining conditions are optimized. Thus, once a plasma is excited, the position of the mode-mixer can be changed to move the position of the maxima for a uniform time-averaged plasma process (e.g., heating).

Thus, consistent with this invention, mode-mixing can be useful during plasma ignition. For example, when an electrically conductive fiber is used as a plasma catalyst, it is known that the fiber's orientation can strongly affect the minimum plasma-ignition conditions. It has been reported, for example, that when such a fiber is oriented at an angle that is greater than 60° to the electric field, the catalyst does little to improve, or relax, these conditions. By moving a reflective surface either in or near the cavity, however, the electric field distribution can be significantly changed.

Mode-mixing can also be achieved by launching the radiation into the applicator chamber through, for example, a rotating waveguide joint that can be mounted inside the applicator chamber. The rotary joint can be mechanically moved (e.g., rotated) to effectively launch the radiation in different directions in the radiation chamber. As a result, a changing field pattern can be generated inside the applicator chamber.

Mode-mixing can also be achieved by launching radiation in the radiation chamber through a flexible waveguide. In one embodiment, the waveguide can be mounted inside the chamber. In another embodiment, the waveguide can extend into the chamber. The position of the end portion of the flexible waveguide can be continually or periodically moved (e.g., bent) in any suitable manner to launch the radiation (e.g., microwave radiation) into the chamber at different directions and/or locations. This movement can also result in mode-mixing and facilitate more uniform plasma processing (e.g., heating) on a time-averaged basis. Alternatively, this movement can be used to optimize the location of a plasma for ignition or other plasma-assisted process, such as synthesis of carbon structures.

If the flexible waveguide is rectangular, for example, a simple twisting of the open end of the waveguide will rotate the orientation of the electric and the magnetic field vectors in the radiation inside the applicator chamber. Then, a periodic twisting of the waveguide can result in mode-mixing as well as rotating the electric field, which can be used to assist ignition, modulation, or sustaining of a plasma.

Thus, even if the initial orientation of the catalyst is perpendicular to the electric field, the redirection of the electric field vectors can change the ineffective orientation to a more effective one. Those skilled in the art will appreciate that mode-mixing can be continuous, periodic, or preprogrammed.

In addition to plasma ignition, mode-mixing can be useful during subsequent plasma processing, such as synthesis and growth of predetermined carbon structures, to reduce or create (e.g., tune) "hot spots" in the chamber. When an electromagnetic radiation cavity only supports a small number of modes (e.g., less than 5), one or more localized electric field maxima can lead to "hot spots" (e.g., within cavity 12). In one embodiment, these hot spots could be configured to coincide with one or more separate, but simultaneous, plasma ignitions or carbon structure growth processes. Thus, in one embodiment, a plasma catalyst can be located at one or more of those ignition or growth positions.

Multi-location Plasma Ignition

A plasma can be ignited using multiple plasma catalysts at different locations. In one embodiment, multiple fibers can be used to ignite the plasma at different points within the cavity. Such multi-point ignition can be especially beneficial when a uniform plasma ignition is desired. For example, when a plasma is modulated at a high frequency (i.e., tens of Hertz and higher), or ignited in a relatively large volume, or both, substantially uniform instantaneous striking and re-striking of the plasma can be improved. Alternatively, when plasma catalysts are used at multiple points, they can be used ti sequentially ignite a plasma at different locations within a plasma chamber by selectively introducing the catalyst at those different locations. In this way, a plasma ignition gradient can be controllably formed within the cavity, if desired.

Also, in a multi-mode cavity, random distribution of the catalyst throughout multiple locations in the cavity increases the likelihood that at least one of the fibers, or any other passive plasma catalyst consistent with this invention, is optimally oriented with the electric field lines. Still, even where the catalyst is not optimally oriented (not substantially aligned with the electric field lines), the ignition conditions are improved.

Furthermore, because a catalytic powder can be suspended in a gas, it is believed that each powder particle may have the effect of being placed at a different physical location within the cavity, thereby improving ignition uniformity within the cavity.

Dual-Cavity Plasma Igniting/Sustaining

Figure 10:
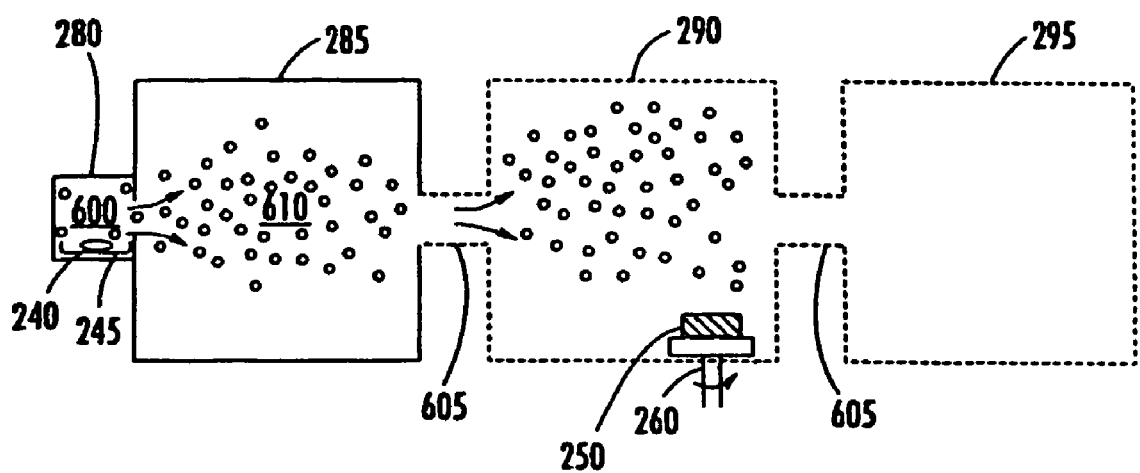
FIG. 10 shows an illustrative embodiment of a portion of the plasma-assisted system for synthesizing carbon structures shown in FIG. 1, with additional optional plasma chambers, consistent with this invention.

A dual-cavity arrangement can be used to ignite and sustain a plasma consistent with this invention. In one embodiment, a system includes at least ignition cavity 280 and plasma processing (e.g., carbon structure synthesis) cavity 285 in fluid communication with each other, for example, as shown in FIG. 10. Cavities 280 and 285 can be located, for example, inside electromagnetic radiation chamber (i.e., applicator) 14, as shown in FIG. 1.

To form an ignition plasma, a gas in first ignition cavity 280 can be subjected to electromagnetic radiation having a frequency less than about 333 GHz, optionally in the presence of a plasma catalyst. In this way, the proximity of the first and second cavities can permit plasma 600, formed in cavity 280, to ignite plasma 610 in cavity 285, which may be sustained with additional electromagnetic radiation. Additional cavities 290 and 295 are optional, and can be kept in fluid communication with cavity 285 by channel 605, for example. A substrate, for example, onto which carbon structure synthesis and growth is desired, such as substrate 250, can be placed in any of cavities 285, 290, or 295 and can be supported by any type of supporting device, such as support 260, which optionally moves or rotates substrate 250 during the synthesizing and growth procedures.

In one embodiment of this invention, cavity 280 can be very small and designed primarily, or solely for plasma ignition. In this way, very little electromagnetic radiation energy may be required to ignite plasma 600, permitting easier ignition, especially when a plasma catalyst is used consistent with this invention. It will also be appreciated that the cavities used in the plasma system consistent with the present invention can have a variable size, and a controller can be used to control the size of the cavity.

In one embodiment, cavity 280 can be a substantially single mode cavity and cavity 285 can be a multi-mode cavity. When cavity 280 only supports a single mode, the electric field distribution may strongly vary within the cavity, forming one or more precisely located electric field maxima. Such maxima are normally the first locations at which plasmas ignite, making them ideal points for placing plasma catalysts. It will be appreciated, however, that when a plasma catalyst is used to ignite plasma 600, the catalyst need not be placed in the electric field maximum and, in many cases, need not be oriented in any particular direction.

Synthesizing Carbon Structures

FIGS. 11-14 show various illustrative embodiments of methods and apparatus that can be used to synthesize one or more predetermined carbon structures on one or more substrates consistent with this invention. As used herein, the word "synthesis" refers to the formation and/or growth of structures that include carbon, and optionally other atoms or molecules, with or without the use of a catalytic surface or seed.

FIG. 10, already described above, shows how a dual-cavity system can be used to ignite a plasma in one chamber, which is then used to form a plasma in another. FIG. 10 also shows how additional chambers can be added sequentially, if desired. It will be appreciated that carbon structure synthesis can occur in any of the chambers, or that environmental conditions can be finely tuned so that different carbon structures can be synthesized and grown in different chambers simultaneously during one continuous or periodic plasma process.

Figure 11:
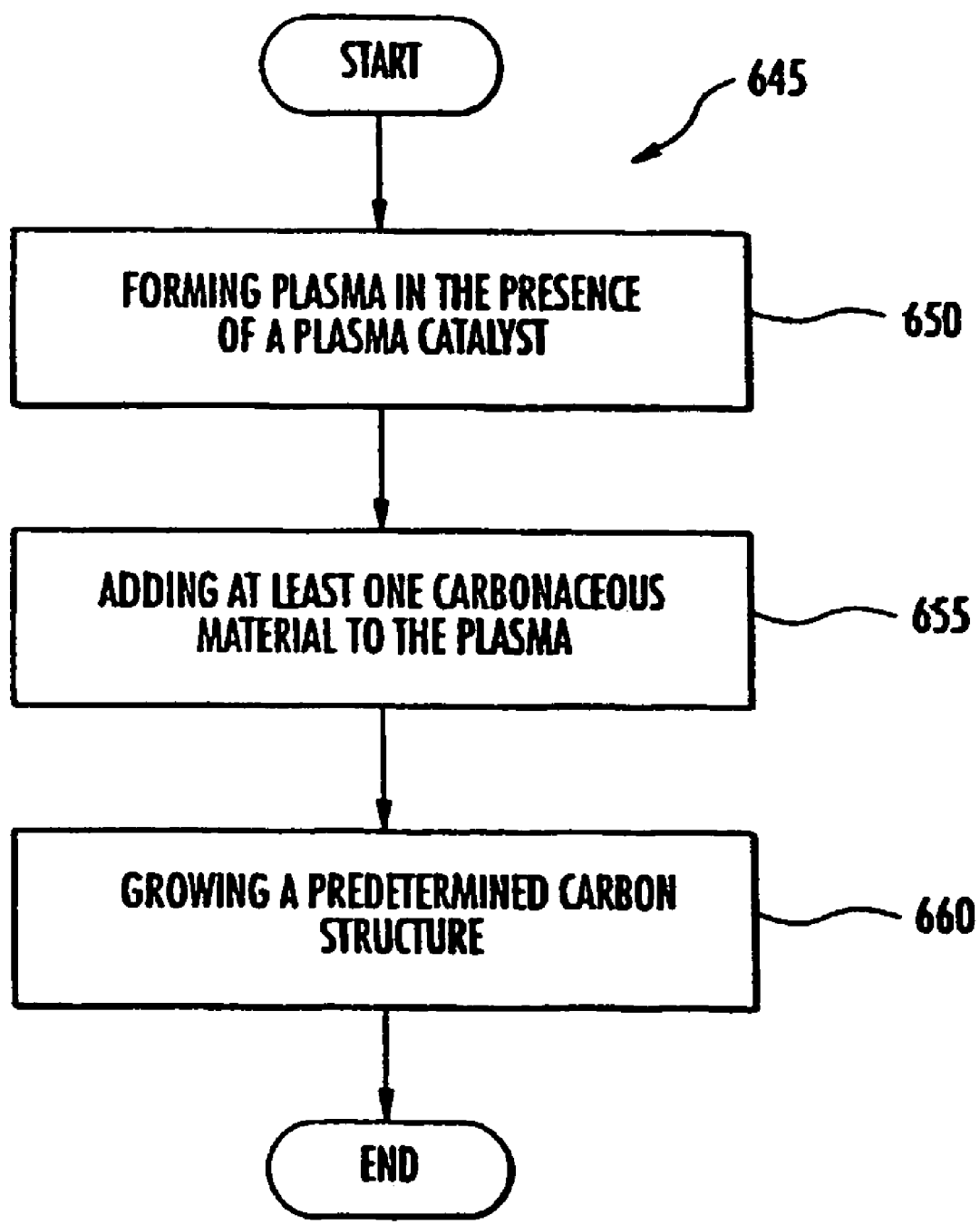
FIG. 11 shows an illustrative embodiment of a method of synthesizing a predetermined carbon structure consistent with this invention.

FIG. 11 shows a flow chart of an illustrative plasma-assisted method 645 for synthesizing carbon structures using a catalyzed plasma consistent with this invention. In this method, a plasma can be formed in step 650 in the presence of a plasma catalyst, such as by subjecting a gas to electromagnetic radiation in the presence of the plasma catalyst. As already described above in detail, any plasma catalyst, such as a passive plasma catalyst or an active plasma catalyst, can be used to ignite, and then to modulate or sustain, a plasma consistent with this invention.

In step 655, at least one carbonaceous material can be added to the plasma. A carbonaceous material can be a precursor to the final desired carbon structure, or a carbon containing compound. For example, certain precursor materials, such as graphite or hydrocarbons (e.g., methane), can be introduced to the plasma in the form of a solid, liquid, or gas. These precursors can then be decomposed in the plasma, leaving carbon, in the example above, to synthesize one or more types of carbon structures. The carbonaceous material can be the plasma catalyst itself, and the process of adding can be the consumption of the catalyst by the plasma.

After adding carbonaceous material to the plasma in step 655, one or more predetermined carbon structures can be synthesized (e.g., on a surface of a substrate) in step 660. One of ordinary skill in the art will appreciate that nearly any material can be used as a substrate, especially materials with a crystalline structure. For example, the substrate can be a semiconductor, such as an elemental semiconductor (e.g., C, Ge, Si, a-Sn (gray tin), P, Se, Te, etc.) or a compound semiconductor (e.g., GaAs, GaP, GaN, InP, SiGe, SiC, GaAsP, GaAlAs, InGaAs, InGaP, ZnSe, ZnO, HgTe, etc.). Alternatively, the substrate can be an insulator, or an insulating material with one or more semiconductor layers (e.g., a silicon-on-insulator, "SOI"). Other materials can also be used as a substrate, including organic and inorganic compounds, alloys, and structures.

Different substrates can be used to synthesize different predetermined carbon structures. In addition, the substrate may have a particular type of patterned structure, catalytic surface, or any type of arrayed or disordered seeds.

For example, arrays, pillars, or other surface features can be formed on the surface of a substrate (e.g., a semiconductor or oxide substrate) to form a surface for preferentially synthesizing a given carbon structure. The specific predetermined carbon structure, then, can be determined using a particular array or pillar size, crystal structure, etc. These surfaces can be catalytic (e.g., nickel, cobalt, yttrium, powered iron, including nano-sized powder particles, or another seed material), but need not be (e.g., nanotubes). Thus, the crystal structure of the catalytic surface can determine the location and type of carbon structure synthesis. In this respect, a single surface can include multiple surface portions with different crystal structures and properties.

Figure 12:
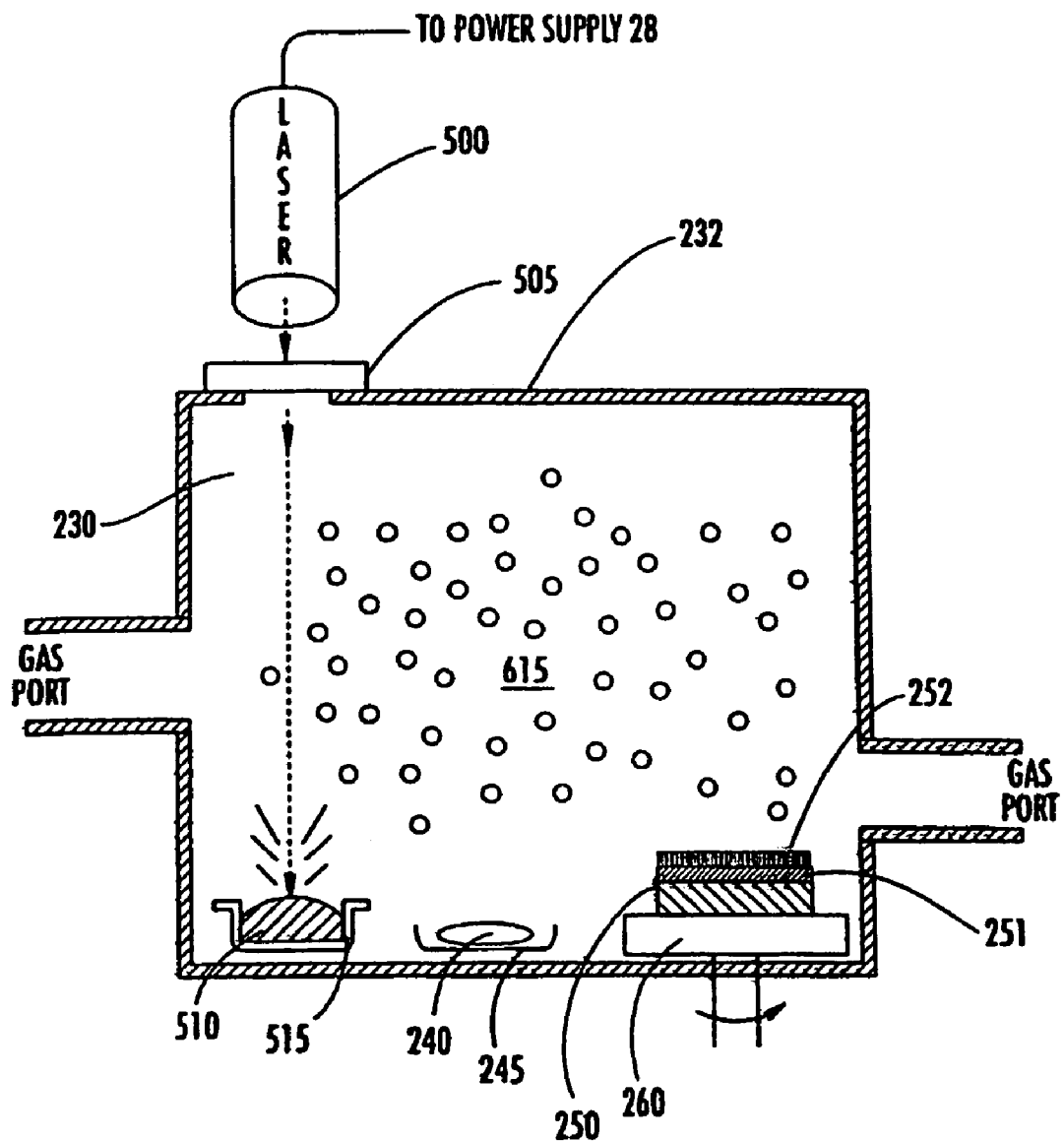
FIG. 12 shows another illustrative embodiment of a portion of the plasma-assisted system for synthesizing carbon structures shown in FIG. 1 including a device for energizing a carbonaceous material consistent with this invention.

Carbon-structure synthesis can be accomplished consistent with this invention using the illustrative apparatus shown in FIG. 12. In this apparatus, a plasma can be ignited in cavity 230 by subjecting a gas to electromagnetic radiation in the presence of plasma catalyst 240 to and to synthesize one or more carbon structures on substrate 250. It will be appreciated, however, that any plasma, catalyzed or not, can be used to synthesize carbon structures consistent with this invention.

Carbon-structure synthesis can be accomplished on first surface area of substrate 250 by forming plasma 615 in cavity 230 by subjecting a gas to an amount of electromagnetic radiation in the presence of plasma catalyst 240, which can be located, for example, on mount 245. In addition, laser 500 can provide laser light through optical window 505 to energize (e.g., vaporize, sublime, or sputter) carbonaceous material 510 in crucible 515. Any solid or fluid material that can vaporize, sublime, or sputter upon exposure to laser 500 can be used as carbonaceous material 510, including plasma catalyst 240. Thus, carbonaceous material 510 can serve a dual purpose of catalyzing plasma and providing a source of carbon for the synthesis and growth of predetermined carbon structures. Alternatively, a gas can be injected into the path of a laser beam.

Other types of energy sources, other than laser 500, can be used to energize carbonaceous material 510, including, for example, ion beams, carrier gases, etc.

In one embodiment, laser 500 can produce a beam of light having a wavelength between about 150 nm and 20 μm, although any other convenient wavelength can also be used. It will be appreciated that laser 500 can also be replaced with a non-coherent light source. Laser 500 can also be a high peak power pulsed laser beam that continually, periodically, or in a preprogrammed fashion energizes carbonaceous material 510. A carrier gas, such as Ar (not shown), or any carrier gas described previously, can direct the energized (e.g., vaporized) carbonaceous material toward plasma 615 to form a predetermined carbon structure on substrate 250. It will be appreciated that growth uniformity on the surface of substrate 250 can be modified (e.g., increased) by moving (e.g., rotating) substrate 250 using support 260 (e.g., a turntable). For example, if substrate 250 contains one or more seeds or other catalytic surface structures-251, moving surface 250 can be used to preferentially enhance synthesis of one or more carbon structures 252.

Thus, plasma 615, which can be catalyzed from a gas using plasma catalyst 240, can be enhanced by energizing carbonaceous material 510 with laser 500. It will be appreciated that although FIG. 12 shows a single cavity system, two or more cavities can be used consistent with this invention, as shown in FIG. 10.

It will be appreciated by one of ordinary skill in the art that a plasma-assisted system for synthesizing carbon structures consistent with this invention can include any electronic or mechanical means for introducing a catalyst to a plasma cavity. For example, a fiber can be mechanically inserted before or during the formation of the plasma. It will also be appreciated that plasma 615 can also be triggered by a spark plug, pulsed laser, or even by a burning match stick introduced in cavity 230 before, during, or after the presence of electromagnetic radiation.

It will be further appreciated that carbonaceous material 510 can be separated from plasma 615 during synthesis to better control the introduction of the material into the plasma. For this purpose, one or more walls or screens (not shown) can be placed between carbonaceous material 510 in crucible 515 and plasma 615. Other electromagnetic radiation or plasma shielding methods may also be used.

Plasma 615 can absorb an appropriate level of electromagnetic radiation energy to achieve any predetermined temperature profile (e.g., any selected temperature). In another embodiment consistent with this invention, temperature can be controlled at any synthesis position by adjusting the field distribution within cavity 230, such as by mode-mixing. In addition, temperatures can be controlled by modulating plasma 615 within cavity 230 using a feed or variable duty cycle. The gas pressure in cavity 615 can be less than, equal to, or greater than atmospheric pressure. At least one additional carbonaceous material (not shown) can be added to plasma 615, thereby allowing it to form a multi-component or multi-layered carbon structure on the surface of substrate 250. The rate at which gas flows through the cavity can also be used to control the plasma temperature.

Figure 13:
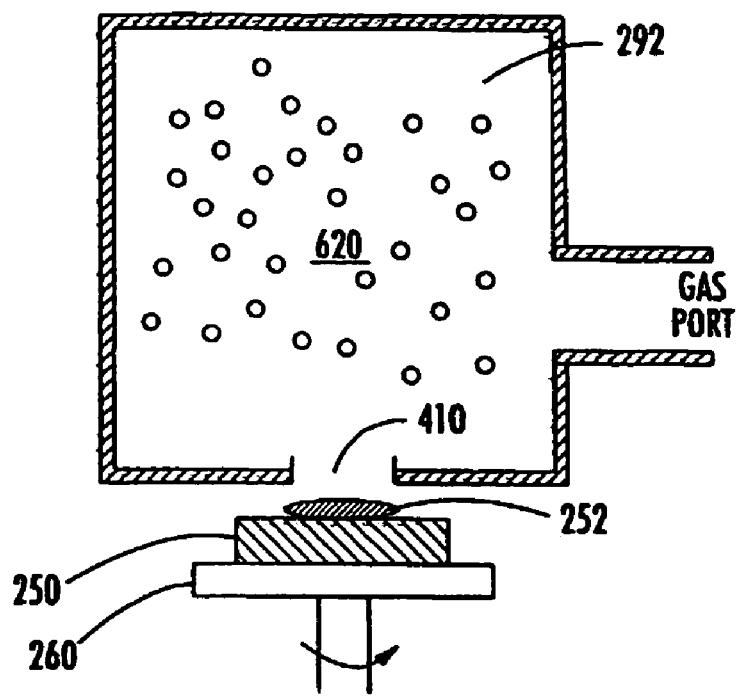
FIG. 13 shows still another illustrative embodiment of a portion of a plasma-assisted system for synthesizing carbon structures through an aperture consistent with this invention.

FIG. 13 shows another embodiment consistent with this invention where the synthesis of predetermined carbon structures can take place outside of a plasma cavity. In this case, cavity 292 can have aperture 410, which may be located at or near the bottom of cavity 292 to help prevent plasma 620 from escaping cavity 292. It will be appreciated, however, that aperture 410 can be located at any position of cavity 292. Substrate 250 can be supported by mount 260 and optionally rotated or otherwise moved with respect to aperture 410. Plasma 620 inside cavity 292 can include one or more carbonaceous materials that can be deposited on a surface of substrate 250.

Plasma 620 can be sustained or modulated in cavity 292 and substrate 250 can be maintained at any desirable temperature, such as a temperature substantially below that of plasma 620 to increase the deposition rate and adhesion of the carbonaceous material. Then, predetermined carbon-structure region 252 can be formed by growing carbonaceous material deposited using plasma 620 as a source of heat or any other external heat source (not shown). An advantage of using plasma 620 as a source of heat is that the entire substrate need not be heated, so that carbon-structure synthesis can be spatially selective. This can be particularly useful when other temperature-sensitive components are prefabricated in the substrate. In addition, mount 260 can be heated or cooled by any external means (e.g., a heat exchanger) to keep substrate 250 at a desirable temperature. For example, a cooling fluid (e.g., gas) can be used to cool substrate 250 before, during, or after a carbon growth process.

It will be appreciated that the carbonaceous material passing through aperture 410 may be combined with one or more other materials or gases (not shown), inside or outside cavity 292, to achieve any desired carbon composition. It will also be appreciated that the materials can pass through aperture 410 in the form of a plasma, such as in the form of a plasma jet.

Although igniting, modulating, or sustaining a plasma consistent with this invention can occur, for example, at atmospheric pressure (using, for example, a regulated flow of a carrier gas), a predetermined carbon structure can be synthesized and grown on substrate 250 at the same or different pressure, including below, at, or above atmospheric pressure. Furthermore, as described above, plasma pressure and temperature can be varied as desired. For example, using a system (like the one shown in FIG. 10) allows one to modulate or sustain plasma 610 at atmospheric pressure in cavity 285, and synthesize and grow a predetermined carbon structure on substrate 250 in another cavity (e.g., cavity 285, 290, or 295) at a pressure higher or lower than atmospheric pressure. Such flexibility can be very desirable in, for example, large scale manufacturing processes.

Figure 14:
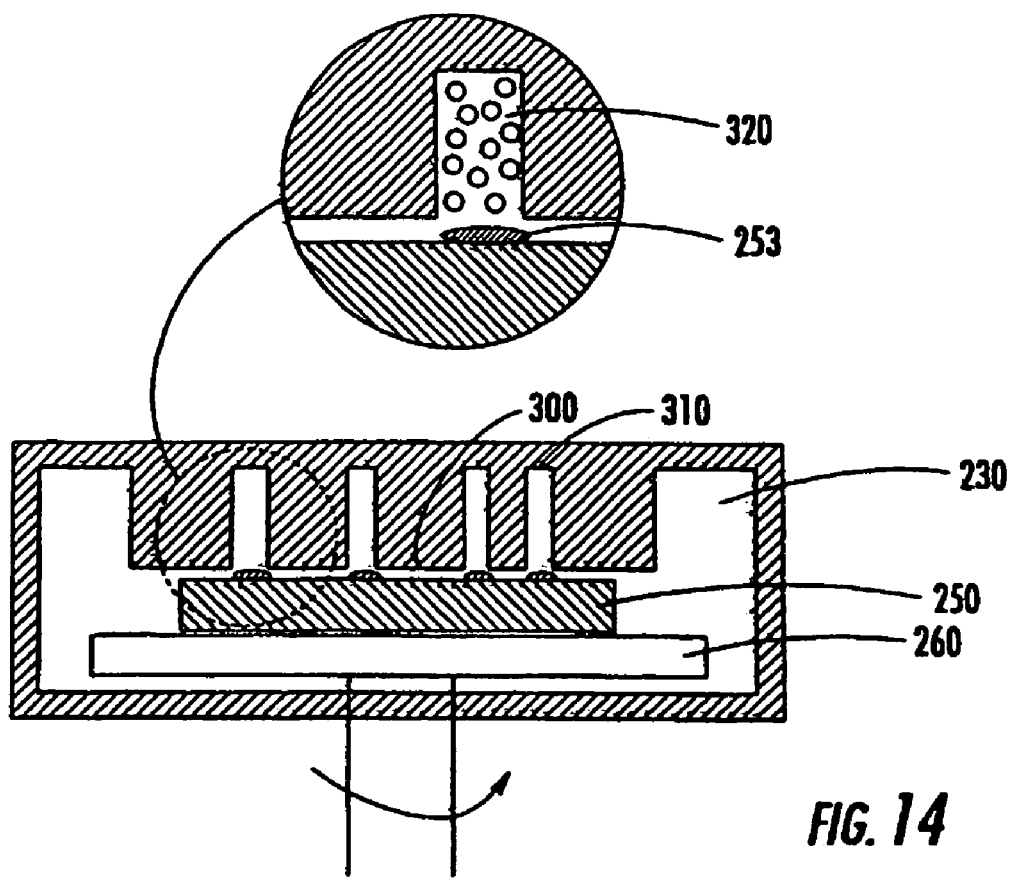
FIG. 14 shows yet another illustrative embodiment of a portion of a plasma-assisted system for synthesizing carbon structures, where the plasma cavity has internal surface features for fabricating patterned regions of carbon structures consistent with this invention.

FIG. 14 shows a cross-sectional view of an inner surface of cavity 230 containing surface features (e.g., one or more topographical features). These features can be used to form selective regions for synthesis of carbon structures on electrically conductive substrate 250. Plasma 320 can be modulated or sustained, for example, at predetermined locations above the surface of substrate 250 by providing a sufficient gap between that surface and the inner surface of cavity 230. For example, plasma 320 can be formed, and a predetermined carbon structure can be synthesized adjacent plasma 320, for example, on seed region 253, when the gap is at least about $\lambda/4$ (e.g., below surface 320), where $\lambda$ is the wavelength of the applied electromagnetic radiation. On the other hand, when the gap is less than about $\lambda/4$ (below surface 300), little or no plasma will form there and a carbonaceous material may not be deposited. Thus, predetermined carbon structures can be selectively synthesized and grown adjacent to plasmas on carbon structure seed region 253, but can be selectively prevented where plasma is prevented. It will be appreciated that the pattern shown in FIG. 14 is not the only possible pattern.

It will also be appreciated that the plasma-formation dependency on wavelength results from the boundary conditions imposed by electrically-conductive surfaces, such as an inner metallic surface of a cavity. When non-metallic surfaces are used, the size of the local plasma volume can be increased or decreased. A decrease of this volume, for example, can limit the plasma strength and, thereby, the energy flux at the adjacent catalytic surface.

Although FIG. 14 shows the inner surface of cavity 230 with raised and depressed surface features, it will also be appreciated that these features can be located on substrate 250, and the inner surface of cavity 230 can be relatively flat or smooth.

Thus, surface features present on substrate 250 can effectively act like a mask during synthesis of the carbon structures to restrict where the structures are allowed to grow. This "mask" can be the substrate itself, or it can be a photo resist, for example, like that used in the semiconductor industry, or it can be any other material used to alter the geometry of the predetermined carbon structures grown on seed regions (e.g., a sacrificial film designed to prevent synthesis and growth of carbon structures on certain regions, for example, of a semiconductor device). Masks, for example, can be negative or positive photo resists, deposited metals, oxides, or other materials used in a permanent or sacrificial manner to effectuate a desired region of carbon structures.

A possible advantage of carbon-structure synthesis using a catalyzed plasma consistent with this invention may include a highly selective growth rate due to the variable concentration and location of carbonaceous species above substrate 250 during synthesis, even at relatively high pressures inside the chamber.

It will be appreciated that other single and multi-element carbon structures not discussed above can also be formed consistent with this invention.

In the foregoing described embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Embodiments, with each claim standing on its own as a separate preferred embodiment of the invention.

We claim:

1. A method of synthesizing a first predetermined structure comprising carbon atoms, the method comprising:
    forming a first plasma within an electromagnetic radiation chamber or within a first cavity that is disposed in the electromagnetic radiation chamber by subjecting at least a first gas to electromagnetic radiation in the presence of a passive plasma catalyst without adding additional energy to the first plasma, wherein the radiation has a frequency less than about 333 GHz;
    mixing radiation modes of the first plasma within the electromagnetic radiation chamber or within the first cavity that is disposed in the electromagnetic radiation chamber by interacting a mode-mixer in the first cavity with the electromagnetic radiation to establish plural maximum electric field vectors at desired locations on the substrate;
    controllably forming a plasma ignition gradient within the first cavity;
    adding a carbonaceous material to the plasma; and
    growing the predetermined structures on a surface of a substrate.

2. The method of claim 1, wherein the catalyst comprises at least one of metal, inorganic material, carbon, carbon-based alloy, carbon-based composite, electrically conductive polymer, conductive silicone elastomer, polymer nanocomposite, and an organic-inorganic composite.

3. The method of claim 2, wherein the catalyst is in the form of at least one of a nano-particle, a nano-tube, a powder, a dust, a flake, a fiber, a sheet, a needle, a thread, a strand, a filament, a yarn, a twine, a shaving, a sliver, a chip, a woven fabric, a tape, and a whisker.

4. The method of claim 3, wherein the plasma catalyst comprises carbon fiber.

5. The method of claim 1, wherein the catalyst comprises at least one electrically conductive component and at least one additive in a ratio, the method further comprising sustaining the plasma, wherein the sustaining comprises:
    directing additional electromagnetic radiation into the electromagnetic radiation chamber or into the first cavity that is disposed in the electromagnetic radiation chamber; and
    allowing the catalyst to be consumed by the plasma such that the plasma contains the at least one additive.

6. The method of claim 1, wherein the plasma catalyst is the carbonaceous material.

7. The method of claim 1, wherein the substrate surface comprises a catalytically patterned surface.

8. The method of claim 7, wherein the patterned surface comprises a plurality of catalytic particles less than about 200 nm in diameter.

9. The method of claim 1, wherein the substrate surface comprises at least one of a patterned metal, a PdSe alloy, nickel, quartz, iron, cobalt, silicon carbide, and iron oxide with molybdenum.

10. The method of claim 1, wherein the adding comprises energizing the carbonaceous material by an energizing method selected from the group consisting of directing a light beam toward the carbonaceous material, and directing an ion beam toward the carbonaceous material, thereby adding the carbonaceous material to a second plasma.

11. The method of claim 10, wherein the first plasma and the second plasma are the same.

12. The method of claim 1, wherein the predetermined structure is selected from the group consisting of a single-walled carbon nanotube, a multi-walled carbon nanotube, a graphitic polyhedron, a graphitic structure, a fullerene structure, a diamond structure, and any combination thereof.

13. The method of claim 1, further comprising heating the surface of the substrate with a second plasma.

14. The method of claim 13, wherein the first plasma and the second plasma are the same.

15. The method of claim 1, further comprising sustaining the plasma during the growing by directing a sufficient amount of electromagnetic radiation into the electromagnetic radiation chamber or into the first cavity that is disposed in the electromagnetic radiation chamber, wherein the directing is selected from the group consisting of continuously directing, periodically directing, programmed directing, and any combination thereof, to at least control a rate of growth of the predetermined structure.

16. The method of claim 15, wherein the plasma has an associated temperature, the method further comprising controlling the temperature according to a predetermined temperature profile by varying at least one of a gas flow through the electromagnetic radiation chamber or through the first cavity that is disposed in the electromagnetic radiation chamber and an electromagnetic radiation level in the electromagnetic radiation chamber or in the first cavity that is disposed in the electromagnetic radiation chamber, to at least control a rate of growth of the predetermined structure.

17. The method of claim 15, wherein the sustaining comprises supplying the sufficient amount of electromagnetic radiation through at least one of a waveguide, a coaxial cable, and an antenna, such that electromagnetic radiation passes through a vessel including the electromagnetic radiation chamber or the first cavity that is disposed in the electromagnetic radiation chamber and is absorbed by the gas to form the plasma.

18. The method of claim 15, wherein a vessel including the electromagnetic radiation chamber or the first cavity that is disposed in the electromagnetic radiation chamber has an interior surface with at least one surface feature, and wherein the growing comprises forming a first pattern of the predetermined structure on the surface of the substrate based on the at least one surface feature.

19. The method of claim 15, wherein the growing comprises:
    growing the first predetermined structure on the substrate surface under a first set of growing conditions; and growing a second predetermined structure under a second set of growing conditions after growing the first predetermined structure, wherein the second predetermined structure is grown on at least one of the substrate surface, the first predetermined structure, and a combination of both.

20. The method of claim 1, wherein a second multi-mode cavity is connected to the electromagnetic radiation chamber or the first cavity that is disposed in the electromagnetic radiation chamber, the method further comprising:
placing the substrate in the second multi-mode cavity;
sustaining the plasma in the electromagnetic radiation chamber or the first cavity that is disposed in the electromagnetic radiation chamber during the growing; and
flowing the at least one carbonaceous material from the electromagnetic radiation chamber or the first cavity that is disposed in the electromagnetic radiation chamber into the second multi-mode cavity after the adding, thereby permitting the growing in the second multi-mode cavity.

21. The method of claim 1, wherein the electromagnetic radiation chamber or the first cavity that is disposed in an electromagnetic radiation chamber is formed in a vessel that has an aperture, the method further comprising:
placing the substrate outside the electromagnetic radiation chamber or outside the first cavity that is disposed in an electromagnetic radiation chamber near the aperture;
sustaining the plasma in the electromagnetic radiation chamber or in the first cavity that is disposed in an electromagnetic radiation chamber while adding a carbon structure formation; and
flowing the at least one carbonaceous material from the electromagnetic radiation chamber or from the first cavity that is disposed in an electromagnetic radiation chamber through the aperture to permit the growing on the substrate.

22. The method of claim 1, further comprising adding a material to the plasma that contains non-carbon atoms, such that the predetermined structure comprises carbon and non-carbon atoms.

23. The method of claim 1, further comprising adding at least a second gas to the plasma.

24. The method of claim 23, wherein the second gas comprises hydrogen to inhibit oxidation during the growing.

25. The method of claim 1, wherein the growing is controlled by regulating a rate at which the gas is added, a rate at which the electromagnetic radiation is directed into the electromagnetic radiation chamber or into the first cavity that is disposed in an electromagnetic radiation chamber, a rate at which the carbonaceous material is added, and any combination thereof.

26. The method of claim 1 wherein the electromagnetic radiation chamber or the first cavity that is disposed in an electromagnetic radiation chamber is at atmospheric pressure.

27. The method of claim 1 wherein the plasma catalyst is a solid.

28. The method of claim 1 wherein radiation modes of the first plasma is the electromagnetic radiation chamber or the first cavity that is disposed in an electromagnetic radiation chamber are mixed or redistributed with time.

29. The method of claim 28 wherein said radiation modes are mixed or redistributed by altering any portion of an inner surface of the electromagnetic radiation chamber or of the first cavity that is disposed in an electromagnetic radiation chamber.

30. The method of claim 29 wherein the altering includes disposing a movable, rotatable or translatable reflective surface within the electromagnetic radiation chamber or within the first cavity that is disposed in an electromagnetic radiation chamber.

31. A method of synthesizing a structure comprising carbon atoms, the method comprising:
forming a plasma within an electromagnetic radiation chamber or within a first cavity that is disposed in the electromagnetic radiation chamber by subjecting at least a gas to electromagnetic radiation in the presence of a passive plasma catalyst without adding additional energy to the plasma, wherein the radiation has a frequency less than about 333 GHz, the plasma causing the structure to be synthesized;
mixing radiation modes of the plasma within the electromagnetic radiation chamber or within the first cavity that is disposed in the electromagnetic radiation chamber by interacting a mode-mixer in the first cavity with the electromagnetic radiation to establish plural maximum electric field vectors at desired locations on the substrate;
controllably forming a plasma ignition gradient within the first multi-mode cavity; and
collecting the structure.

32. The method of claim 31, wherein the catalyst comprises at least one of metal, inorganic material, carbon, carbon-based alloy, carbon-based composite, electrically conductive polymer, conductive silicone elastomer, polymer nanocomposite, and an organic-inorganic composite.

33. The method of claim 32, wherein the catalyst is in the form of at least one of a nano-particle, a nano-tube, a powder, a dust, a flake, a fiber, a sheet, a needle, a thread, a strand, a filament, a yarn, a twine, a shaving, a sliver, a chip, a woven fabric, a tape, and a whisker.

34. The method of claim 33, wherein the plasma catalyst comprises carbon fiber.

35. The method of claim 31, wherein the collecting comprises growing the structure on a substrate.

36. The method of claim 31, wherein the electromagnetic radiation chamber or the first cavity that is disposed in an electromagnetic radiation chamber is at atmospheric pressure.

37. The method of claim 31, wherein the plasma catalyst is a solid.

38. The method of claim 31 wherein radiation modes of the plasma in the electromagnetic radiation chamber or in the first cavity that is disposed in an electromagnetic radiation chamber are mixed or redistributed with time.

39. The method of claim 38 wherein said radiation modes are mixed or redistributed by altering any portion of an inner surface of the electromagnetic radiation chamber or of the first cavity that is disposed in an electromagnetic radiation chamber.

40. The method of claim 39 wherein the altering includes disposing a movable, rotatable or translatable reflective surface within the electromagnetic radiation chamber or within the first cavity that is disposed in an electromagnetic radiation chamber.

* * * * *

UNITED STATES PATENT AND TRADEMARK OFFICE
CERTIFICATE OF CORRECTION

PATENT NO. : 7,445,817 B2
APPLICATION NO. : 10/513309
DATED : November 4, 2008
INVENTOR(S) : Satyendra Kumar et al.

It is certified that error appears in the above-identified patent and that said Letters Patent is hereby corrected as shown below:

Column 4, line 59, "hydrocarbon" should read --hydro-carbon--;

Column 8, line 27, "AS4CGP3K" should read --AS4C-GP3K--;

Column 8, line 66, "consumed for" should read --consumed. For--;

Column 11, line 66, "t can" should read --it can--;

Column 14, line 39, "ti" should read --to--;

Column 17, line 7, "structures-251," should read --structures 251,--;

Column 18, line 37, "where A" should read --where $\lambda$--; and

Column 21, claim 26, line 54, "chanber" should read --chamber--.

Signed and Sealed this

First Day of September, 2009

David J. Kappos
*Director of the United States Patent and Trademark Office*